United States Patent
Lipscomb

(10) Patent No.: US 12,010,975 B2
(45) Date of Patent: *Jun. 18, 2024

(54) GRANULAR ABSORBENT AND SYSTEM AND METHOD FOR TREATING OR PROCESSING GRANULAR ABSORBENT DURING GRANULAR ABSORBENT TRANSPORT

(71) Applicant: Pioneer Pet Products, LLC, Cedarburg, WI (US)

(72) Inventor: John M. Lipscomb, Cedarburg, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,298

(22) Filed: Jun. 1, 2021

(65) Prior Publication Data
US 2021/0282361 A1    Sep. 16, 2021

Related U.S. Application Data

(63) Continuation of application No. 16/042,908, filed on Jul. 23, 2018, now Pat. No. 11,019,800, which is a
(Continued)

(51) Int. Cl.
*B29C 48/355* (2019.01)
*A01K 1/015* (2006.01)
(Continued)

(52) U.S. Cl.
CPC .......... *A01K 1/0152* (2013.01); *A01K 1/0154* (2013.01); *A01K 1/0155* (2013.01);
(Continued)

(58) Field of Classification Search
CPC .. A01K 1/0152; A01K 1/0154; A01K 1/0155; B29B 9/06; B29B 9/065; B29C 48/0022; B29C 48/355; B29C 48/911
See application file for complete search history.

(56) References Cited

U.S. PATENT DOCUMENTS

| 3,809,438 A | 5/1974 | Hubbard |
| 4,483,886 A | 11/1984 | Kowalski |

(Continued)

FOREIGN PATENT DOCUMENTS

| DE | 4424946 | 1/1996 |
| KR | 10-2010-0026301 | * 3/2010 |

(Continued)

OTHER PUBLICATIONS

Machine English Translation of KR 10-2010-0026301, printed Oct. 16, 2022. (Year: 2022).*

(Continued)

*Primary Examiner* — Xiao S Zhao
*Assistant Examiner* — Joseph S Leyson
(74) *Attorney, Agent, or Firm* — Boyle Fredrickson S.C.

(57) ABSTRACT

A system and method for treating or processing granular absorbent while the granular absorbent is being transported in a fluid stream that preferably is a stream of air. The system includes a pneumatic conveyor with a conduit that draws pellets exiting an extruder into the conduit drying the pellets as they are transported through the conduit. Material can be introduced that dries, coats or otherwise treats the pellets while the pellets are transported through the conduit. Coating material, e.g., powdered bentonite can coat and also dry pellets during transport. A conduit can have inner pellet treating surface that abrades pellets transported through the conduit producing smaller fines that can be packaged with (Continued)

pellets forming a granular absorbent product that forms clumps on top that extend generally horizontally.

33 Claims, 10 Drawing Sheets

Related U.S. Application Data continuation of application No. 14/605,045, filed on Jan. 26, 2015, now Pat. No. 10,028,481, which is a continuation-in-part of application No. 13/868,084, filed on Apr. 22, 2013, now Pat. No. 9,266,090, and a continuation-in-part of application No. 13/868,073, filed on Apr. 22, 2013, now Pat. No. 9,266,089, and a continuation-in-part of application No. 13/842,534, filed on Mar. 15, 2013, now Pat. No. 9,266,088.

(60) Provisional application No. 61/931,609, filed on Jan. 25, 2014, provisional application No. 61/952,133, filed on Mar. 12, 2014, provisional application No. 61/775,707, filed on Mar. 11, 2013, provisional application No. 61/699,858, filed on Sep. 11, 2012.

(51) Int. Cl.
| | | |
|---|---|---|
| *B29B 9/06* | (2006.01) | |
| *B29C 48/00* | (2019.01) | |
| *B29C 48/88* | (2019.01) | |

(52) U.S. Cl.
CPC ........ *B29C 48/0022* (2019.02); *B29C 48/355* (2019.02); *B29C 48/911* (2019.02); *B29B 9/06* (2013.01)

(56) References Cited

U.S. PATENT DOCUMENTS

| | | |
|---|---|---|
| 4,821,677 A * | 4/1989 | Harrison .............. A01K 1/0154 |
| | | 119/173 |
| 4,954,352 A | 9/1990 | Luker |
| 5,209,185 A | 5/1993 | Chikazawa |
| 5,505,567 A * | 4/1996 | Scott ...................... A21C 11/16 |
| | | 406/106 |
| 5,938,994 A | 8/1999 | English et al. |
| 6,089,189 A | 7/2000 | Goss et al. |
| 6,220,206 B1 | 4/2001 | Sotillo et al. |
| 8,733,288 B2 | 5/2014 | Winkleman et al. |
| 10,882,238 B2 | 1/2021 | Lipscomb |
| 11,019,800 B2 * | 6/2021 | Lipscomb ............ A01K 1/0154 |
| 2004/0000069 A1 * | 1/2004 | Gurol ..................... B02C 13/18 |
| | | 34/592 |
| 2004/0079293 A1 | 6/2004 | Rasner et al. |
| 2004/0142081 A1 | 7/2004 | Durand et al. |
| 2005/0056229 A1 | 3/2005 | Greene et al. |
| 2009/0062427 A1 | 3/2009 | Tornow et al. |
| 2009/0217882 A1 | 9/2009 | Jenkins |
| 2010/0269758 A1 | 10/2010 | Fuchshuber |
| 2011/0185977 A1 * | 8/2011 | Dixon .................... A01K 29/00 |
| | | 119/173 |
| 2011/0210463 A1 | 9/2011 | Schmidt et al. |
| 2013/0280976 A1 * | 10/2013 | McCann ............. B29B 17/0042 |
| | | 442/396 |
| 2016/0304295 A1 | 10/2016 | Thorn et al. |

FOREIGN PATENT DOCUMENTS

| | | |
|---|---|---|
| WO | 2009018997 | 2/2009 |
| WO | 2011094022 | 8/2011 |
| WO | 2015113006 | 7/2015 |
| WO | 2016071367 | 5/2016 |

OTHER PUBLICATIONS

Meshram et al. "Simultaneous Gelatinization and Drying of Maize Starch in a Single-Screw Extruer", Drying Technology, vol. 27, No. 1, Jan. 2, 2009 (Jan. 2, 2009), pp. 113-122.

* cited by examiner

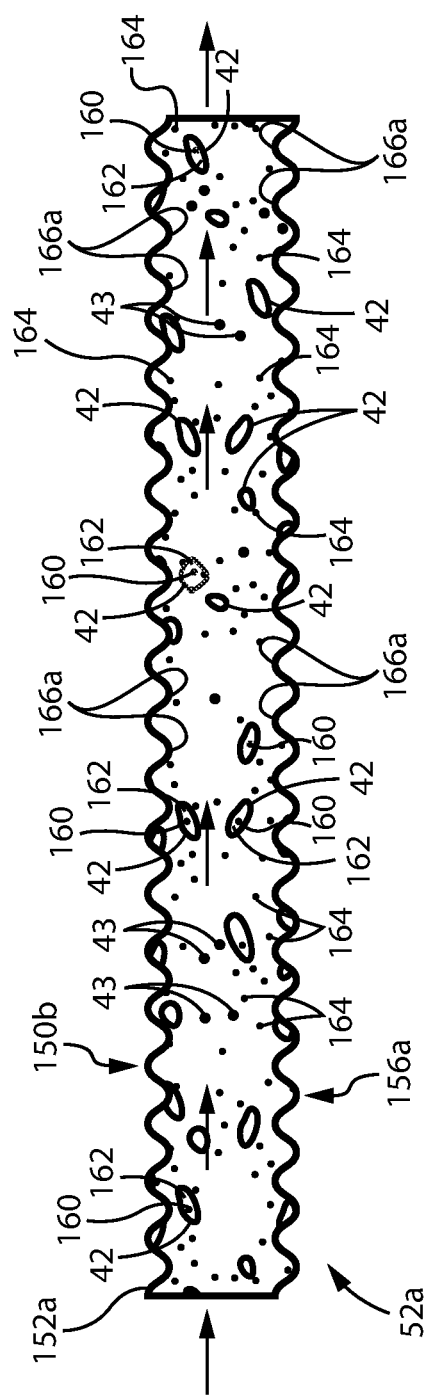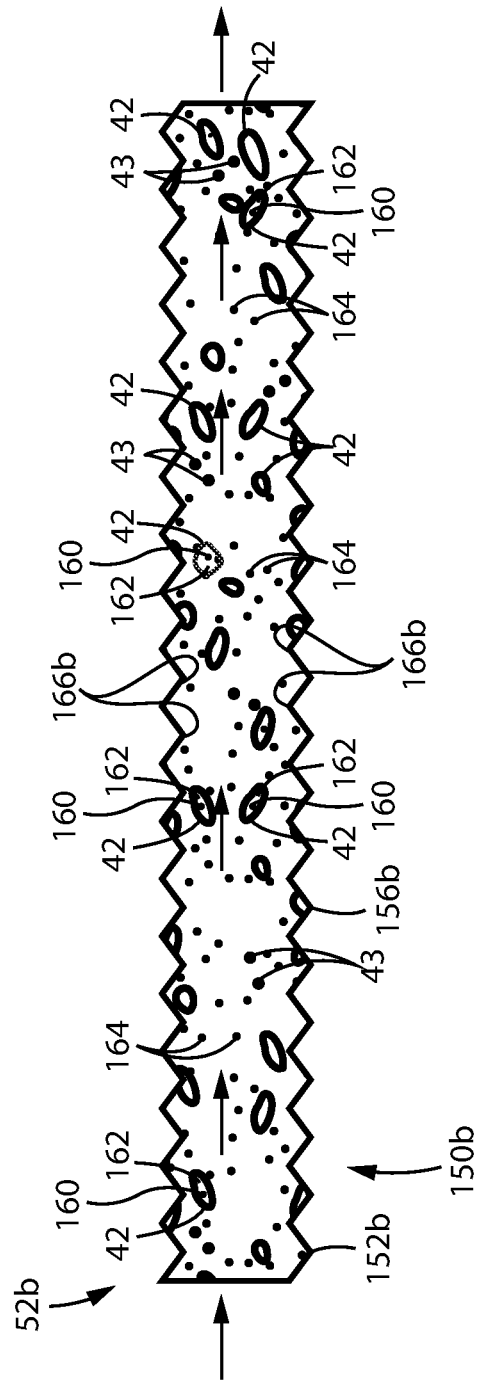

GRANULAR ABSORBENT AND SYSTEM AND METHOD FOR TREATING OR PROCESSING GRANULAR ABSORBENT DURING GRANULAR ABSORBENT TRANSPORT

CROSS REFERENCE

This application is a continuation of U.S. patent application Ser. No. 16/042,908, filed Jul. 23, 2018 (U.S. Pat. No. 11,019,800, issued Jun. 1, 2021), which is a continuation of U.S. patent application Ser. No. 14/605,045, filed Jan. 26, 2015 (U.S. Pat. No. 10,028,481, issued Jul. 24, 2018), which claims priority in U.S. Provisional Patent Application Nos. 61/931,609 filed Jan. 25, 2014, and 61/952,133 filed Mar. 12, 2014, under 35 U.S.C. § 119(e). U.S. patent application Ser. No. 14/605,045, filed Jul. 23, 2018 also is a continuation-in-part of each of U.S. patent application Ser. No. 13/868,084 filed Apr. 22, 2013 (U.S. Pat. No. 9,266,090, issued Feb. 23, 2016), U.S. patent application Ser. No. 13/868,073 filed Apr. 22, 2013 (U.S. Pat. No. 9,266,089, issued Feb. 23, 2016), and U.S. patent application Ser. No. 13/842,534 filed Mar. 15, 2013 (U.S. Pat. No. 9,266,088, issued Feb. 23, 2016), each of which claims priority in U.S. Provisional Patent Application No. 61/775,707 filed Mar. 11, 2013 and in U.S. Provisional Patent Application No. 61/699,858 filed Sep. 11, 2012 under 35 U.S.C. § 119(e) the entire disclosure of each of which is expressly incorporated herein by reference.

FIELD

The present invention is directed to granular absorbent, including self-clumping granular absorbent, and more particularly to a system and method for treating or processing granular absorbent during granular absorbent transport.

BACKGROUND

While attempts have been made in the past to produce a lighter, more natural, and even biodegradable cat litter, improvements nonetheless remain desirable. Conventional clay-based and gel-based litters are relatively heavy, cost a considerable amount of money to ship, and are often a burden for purchasers to carry. While many so-called natural cat litters have been introduced into the marketplace, they can be nearly as heavy as conventional litter, typically absorb far less urine than conventional litter, can produce their own unpleasant odor, and many times do not clump well, if they even clump at all.

SUMMARY

The present invention is directed to a system and method for processing granular absorbent during transport that includes a pneumatic conveyor that provides granular absorbent transport while (a) drying granular absorbent, (b) cooling granular absorbent, (c) performing granular absorbent surface preparation, (d) coating granular absorbent, (e) wetting granular absorbent, and/or (f) liquid treating granular absorbent is carried out. In one preferred system and method of processing granular absorbent during transport of the granular absorbent, at least a plurality of (a) drying, (b) cooling, (c) performing surface preparation, (d) coating, (e) wetting, and (f) treating of granular absorbent are performed during transport. In another preferred system and method, a plurality of pairs, i.e., at least three, of (a) drying, (b) cooling, (c) surface preparation; (d) coating, (e) wetting, and (f) treating granular absorbent are performed during granular absorbent transport.

In a preferred system embodiment, the pneumatic conveyor has a conduit that preferably is an elongate duct with an intake at one end through which granular absorbent enters where the granular absorbent is transported through the duct to a duct outlet at the opposite end where the granular absorbent is discharged. Where the pneumatic conveyor is used to transport granular absorbent from an extruder, the intake of the pneumatic conveyor duct is disposed adjacent a discharge end of the extruder and configured to enable extruded granular absorbent to enter the intake within a second or two of being extruded. Where the pneumatic conveyor is used to transport granular absorbent from an extruder, processing of granular absorbent can be performed immediately upon extrusion during transport into the pneumatic conveyor duct inlet and/or during transport of the extruded granular absorbent through the pneumatic duct.

In one preferred system and method in accordance with the present invention, the granular absorbent is an extruded granular absorbent that is extruded by a single screw or twin screw extruder. The extruded granular absorbent is then transported by the pneumatic conveyor away from the extruder. Processing of the extruded granular absorbent is preferably performed after extrusion including while the extruded granular absorbent is being transported. In one such preferred system and method used to process extruded granular absorbent during transport, extruded granular absorbent is transported by the pneumatic conveyor within a second or two of being extruded by the extruder. In the same preferred system and method, processing of the extruded granular absorbent would be performed during transport by the pneumatic conveyor. In another such system and method, processing of the extruded granular absorbent occurs right after extrusion and during pneumatic conveyor transport.

A preferred extruded granular absorbent is extruded in the form of liquid-absorbent pellets composed of starch-based or starch-containing material and/or fiber that preferably includes insoluble fiber, e.g., cellulose. The liquid-absorbent pellets preferably include a binder in an amount sufficient in each pellet to cause pellets to readily clump together when wetted by a liquid, such as water, urine, liquid fecal matter, or another waste or toxic liquid, thereby producing self-clumping liquid-absorbent pellets. Such a binder can be, but is not limited to, a starch-based or starch-containing bioadhesive 7 such as dextrin, and/or a synthetic adhesive, such as an acrylic adhesive, which is carried by, e.g., coated, and/or disposed in each pellet in an amount sufficient to produce self-clumping liquid-absorbent pellets. Such a binder can be extruded in each pellet during granular absorbent extrusion and/or applied to the pellets after extrusion.

A preferred granular absorbent is formed of liquid-absorbent pellets having a binder in a sufficient amount to produce clumps when wetted by liquid, namely water, urine or another waste liquid, formed of at least a plurality of pairs, i.e., at least three, of pellets in each clump that each possess at least 90% clump retention and/or which have a crush or compressive strength of at least 25 pounds per square inch (PSI) and preferably at least 40 PSI when the clump is substantially dry (having between 10% and 15% moisture by clump weight). One such preferred granular absorbent is formed of liquid-absorbent pellets having a binder in a sufficient amount to produce clumps when wetted during use as a liquid absorbent that possess at least about 90% clump retention (±3%) and which have a crush or compressive strength of at least about 50 PSI (±5%) when the clump is substantially dry.

One such preferred granular absorbent is formed of liquid-absorbent pellets each having binder sufficient to self-clump when wetted by water or urine producing clumps possessing at least 95% clump retention and/or having a crush or compressive strength of at least 25 PSI and preferably at least 40 PSI when the clump is substantially dry. Another such preferred granular absorbent formed of liquid-absorbent binder-containing pellets produces clumps when wetted that possess at least about 95% clump retention (±3%) and that have a crush or compressive strength of at least about 50 PSI (±5%) when the clump is substantially dry.

Another preferred granular absorbent is formed of liquid-absorbent pellets having at least 15% water-soluble binder, by uncoated pellet weight, in the form of a starch-based or starch-containing water soluble binder, which can be cold water soluble and/or include or contain at least some dextrin, which is an amount of water soluble binder sufficient to produce self-clumping of wetted pellets during liquid absorbent use producing clumps formed of at least a plurality of pairs, i.e., at least three, of the pellets that each at least about 97% clump retention (±3%) when the clump is substantially dry (having between 10% and 15% moisture by clump weight). One such preferred granular absorbent is formed of liquid-absorbent pellets having at least 18% water-soluble binder, by uncoated pellet weight, in the form of a starch-based or starch-containing water soluble binder, which can be cold water soluble and/or include or contain at least some dextrin, which is an amount of water soluble binder sufficient to clumps possessing at least 95% clump retention and having a crush or compressive strength of at least 50 PSI when the clump is substantially dry. Another such preferred granular absorbent is formed of liquid-absorbent pellets having at least 20% water-soluble binder, by uncoated pellet weight, in the form of a starch-based or starch-containing water soluble binder, which can be cold water soluble and/or include or contain at least some dextrin, which is an amount of water soluble binder sufficient to clumps possessing at least 95% clump retention and having a crush or compressive strength of at least 50 PSI when the clump is substantially dry. A further such preferred granular absorbent is formed of liquid-absorbent pellets having at least 25% water-soluble binder, by uncoated pellet weight, in the form of a starch-based or starch-containing water soluble binder, which can be cold water soluble and/or include or contain at least some dextrin, which is an amount of water soluble binder sufficient to clumps possessing at least 95% clump retention and having a crush or compressive strength of at least 50 PSI when the clump is substantially dry. Still another such preferred granular absorbent is formed of liquid-absorbent pellets having at least 30% water-soluble binder, by uncoated pellet weight, in the form of a starch-based or starch-containing water soluble binder, which can be cold water soluble and/or include or contain at least some dextrin, which is an amount of water soluble binder sufficient to clumps possessing at least 95% clump retention and having a crush or compressive strength of at least 50 PSI when the clump is substantially dry.

Such high clump retention granular absorbent produces clumps that advantageously retain more of the liquid absorbed by the clumped pellets with the clump by retaining substantially all of the clumped pellets with the clump because very few pellets fall off the clump during removal. Such clumps also better retain their integrity when bumped, walked on, displaced or otherwise contacted or moved, further helping to ensure that a maximum amount of absorbed liquid is removed with the clump when the clump is removed and disposed of.

Such high crush or compressive strength granular absorbent is formed of liquid-absorbent pellets that readily self-clump when absorbing waste-containing liquid, such as urine or liquid fecal matter, but allow water in the waste-containing liquid to evaporate during drying of the clump while capturing and retaining toxic or waste component(s) present in the waste liquid when absorbed to form the clump. When dried, such a high crush or compressive strength clump advantageously encapsulates or locks toxic or waste component(s) within the clump preventing toxic or waste component(s) from evaporating during drying or even solubilizing should the clump be re-wetted.

In a preferred system and method of processing granular absorbent during transport, pellets of granular absorbent are transported in air flowing in a conduit of the pneumatic conveyor, preferably an elongate tubular duct, during which one or more processing steps are performed on the pellets. The pneumatic conveyor includes an air mover, such as in the form of a blower, fan, compressor, or pump, which causes air to flow through the duct in a manner that draws pellets of granular absorbent into a duct intake at one end of the duct and transport the pellets toward a duct outlet at the opposite end of the duct. Such an air mover can be configured to push air through the duct or can be configured to suck air through the duct.

Where such a system is used to process extruded granular absorbent in carrying out a method in accordance with the invention, pellets of uncoated granular absorbent are transported through the duct by the pneumatic conveyor within a second or two after being extruded from the extruder in a granular absorbent transport step during which at least one processing step and preferably at least a plurality of processing steps are performed on the pellets. In such a system, the intake of the duct is located adjacent a discharge of the extruder enabling at least a plurality of pairs, i.e., at least three, of liquid-absorbent pellets extruded per second of extruder operation to be transported into the duct intake within a second or two of being extruded.

A preferred system for processing extruded granular absorbent during pneumatic conveyor transport can include an extruder discharge chamber disposed at the discharge end of the extruder to which the pneumatic conveyor duct is connected enabling pellets of granular absorbent extruded by an extruder to enter the duct intake within a second or two of being extruded by the extruder. The discharge chamber can be of substantially gas-tight construction and can be substantially gas-tightly sealed to the extruder. If desired, the discharge chamber can include one or more vents that can be selectively opened or closed during operation to help regulate the flow of air through the system.

Where the system includes such a discharge chamber, the chamber preferably is an enclosure that substantially completely encloses the discharge end of the extruder, positioning the duct intake close enough to a discharge, e.g., perforate extruder die plate, of the extruder to receive pellets as they are extruded. Air flow through the pneumatic conveyor duct transports the extruded pellets through the discharge chamber into the duct intake where the pellets are further transported through the duct toward the duct outlet.

If desired, the system can include one or more nozzles that each discharge at least one stream of gas, preferably air, generally toward the discharge end of the extruder to help prevent extruded pellets of granular absorbent from sticking or otherwise accumulating outside the pneumatic conveyor duct intake helping to maximize the amount of extruded pellets transported by the pneumatic conveyor. Where one or more such gas nozzles are used, they can be used in a system lacking any extruder discharge chamber as well as in a system employing an extruder discharge chamber. Where used in a system with an extruder discharge chamber, one or more such gas nozzles can be carried by or otherwise mounted to the chamber. Where one or more such gas nozzles are used, they preferably are provided in the form of one or more air-knives each having an elongate or slot-shaped nozzle from which a stream of air, e.g., pressurized air, is expelled.

In a first preferred implementation of a method in accordance with the present invention, a granular absorbent drying step is performed while the granular absorbent transport step is carried out such that extruded liquid-absorbent pellets of granular absorbent are dried during transport of pellets away from the extruder. During the drying step, the moisture content of the extruded liquid-absorbent pellets is reduced during transport of the pellets away from the extruder during the transport step. To dry extruded liquid-absorbent pellets during transport, sufficient air at a great enough volumetric flow rate having a high enough temperature and a low enough humidity is moved by the air mover through the pneumatic conveyor duct or conduit to cause evaporative moisture transfer from the pellets to the flowing air reducing pellet moisture content. Air preferably is drawn from ambient outside the extruder and conduit by the pneumatic conveyor with the ambient air preferably having a temperature no greater than 32 degrees Celsius and preferably having a temperature of about room temperature, e.g., between 20-24 degrees Celsius. Air flowing through the conduit during cooling and drying of the granules or pellets carried by the air preferably has a temperature no greater than 50 degrees Celsius and preferably less than 45 degrees Celsius at or adjacent, e.g., downstream of the inlet or intake of the conduit.

In one drying method step implementation, the drying step is performed as the extruded liquid-absorbent pellets are being transported during the transport step through at least a portion of the duct of the pneumatic conveyor reducing a moisture content of the pellets during transport. In one such drying step implementation, the drying step begins being performed immediately upon extrusion of the pellets from the extruder during transport of the pellets away from the extruder into the duct intake during the transport step. The drying step can continue being performed while the pellets are being further transferred through at least a portion of the duct downstream of the intake during the transport step.

In carrying out such a drying method step implementation where the drying step begins being performed upon pellet extrusion, an initial moisture content of the pellets upon extrusion is reduced to a final moisture content that is less than the initial moisture content when the drying step is completed in the pneumatic conveyor duct. Where the drying step is performed during the entire transport step, the pellet moisture content is reduced from initial moisture content upon pellet extrusion to final moisture content upon pellet discharge from the pneumatic conveyor duct that is less than the initial moisture content.

In carrying out a preferred drying method step implementation, the duct of the pneumatic conveyor of a preferred system embodiment is sized to enable an air flow rate through the conduit of between 500 CFM and 3000 CFM and preferably between about 1500 CFM and 2750 CFM, and an air speed great enough to produce turbulent air flow through the duct to more efficiently and/or more quickly dry the liquid-absorbent pellets of granular absorbent entrained in the turbulently flowing air flowing through the duct during transport. In one system embodiment and drying method step implementation, the duct has a size and/or cross-sectional area through which air at such a flow rate and/or velocity flows that produces turbulent air flow through the duct that reduces pellet moisture content by at least 1% during the drying step. In another system embodiment and drying method step implementation, the duct has a size and/or cross-sectional area through which air at such a flow rate and/or velocity flows that produces turbulent air flow through the duct that reduces pellet moisture content by at least 2% during the drying step. In still another system embodiment and drying method step implementation, the duct has a size and/or cross-sectional area through which air at such a flow rate and/or velocity flows that produces turbulent air flow through the duct that reduces pellet moisture content by at least 3% during the drying step.

Drying of liquid-absorbent pellets in such a drying step carried out during the transport step advantageously reduces the amount of shrinkage of the pellets that ordinarily takes place after extrusion thereby helping to keep pellet density lower than if drying was not performed during pellet transport. Where the pellets are expanded or puffed pellets extruded under superheated and/or adiabatic extruder operating conditions, starting the drying step immediately after extrusion during pellet transport away from the extruder advantageously optimizes pellet density by minimizing shrinkage thereby producing liquid-absorbent pellets having a desirably low density that are well suited for use in a wide variety of consumer and commercial liquid absorbent applications.

Where the drying step is performed during transport of uncoated liquid-absorbent pellets to facilitate coating of the pellets, drying preferably is carried out as quickly as possible after pellet extrusion to help minimize post-extrusion pellet shrinkage or densification thereby helping to keep pellet density optimally low. Where coated, the pellets preferably form lightweight cores substantially completely covered by coating material. Such lightweight cores formed by such pellets intended to be coated preferably are void-filled and/or porous, having a desirably low density or density range prior to coating in accordance with that disclosed elsewhere herein. In one such preferred method implementation where uncoated puffed or expanded pellets are extruded under superheated or adiabatic extrusion conditions, moisture within pellets being extruded flashes or vaporizes upon extrusion producing hot moist pellets whose post-extrusion pellet density increase is advantageously minimized by starting to perform the drying step immediately upon extrusion.

Carrying out such a preferred method implementation of pellet drying during transport that facilitates coating of uncoated liquid-absorbent pellets formulated for being coated advantageously produces lightweight low-density liquid-absorbent pellets well suited for use as pet or animal litter, e.g. cat litter, when coated that have an uncoated density of less than 12 pounds per cubic feet, preferably between 2 and 10 pounds per cubic feet, which in turn produces relatively lightweight liquid-absorbent coated pellets having a density of less than 35 pounds per cubic feet, preferably between 20 and 45 pounds per cubic feet. In one such preferred drying step method implementation where the pellets are dried to facilitate coating, performing the drying step immediately upon extrusion of puffed or expanded liquid-absorbent pellets produces uncoated pellets having a desirably low density of between 3 and 8 pounds per cubic feet which in turn produces coated liquid-absorbent pellets well suited for use as cat litter that possesses a desirably low density of between 26 and 32 pounds per cubic feet. In another such preferred drying step method implementation where the pellets are dried to facilitate coating, performing the drying step immediately upon extrusion of puffed or expanded liquid-absorbent pellets produces uncoated pellets having a desirably low density of between 5 and 12 pounds per cubic feet which in turn produces coated liquid-absorbent pellets well suited for use as cat litter that possesses a desirably low density of between 25 and 30 pounds per cubic feet.

Where such low density relatively lightweight coated liquid-absorbent pellets produce a granular absorbent product for use as cat litter, a preferred pellet coating includes at least one smectite, preferably an absorbent clay, e.g., sodium bentonite and/or calcium bentonite, which helps facilitate urine and liquid fecal matter absorption during litter use. The pellet coating can further include one or more of a zeolite, sodium bicarbonate, sodium carbonate, sodium chloride, calcium bicarbonate, calcium carbonate, calcium chloride, silica, e.g., crystalline silica, a binder, e.g. guar gum and/or an acrylic binder, an anti-bacterial agent, an anti-fungal agent, and/or an anti-parasitic agent.

Where the coating material includes a binder, it preferably is in a dried granular, e.g., powdered, form that is easily mixed with the rest of the coating material constituents disclosed herein. Where the coating material includes a binder, the binder can be a gum, such as guar gum, an acrylic, an acrylic-based binder, an acrylic-containing binder, a starch-based or starch-containing binder, a dextrin binder, a dextrin-based or dextrin-containing binder, a bio-adhesive, or another binder that can be included, e.g., mixed with coating material that is applied to granules or pellets during the coating step at least partially coating the granules or pellets with a coating material containing binder that facilitates or enables self-clumping of a plurality of granules or pellets when wetted during absorbent use. Such binders preferably are mixed with the other coating material constituents in granular form, preferably dry granular form, and can be in powdered form, including where the coating material is provided in a powdered form, such as in accordance with that disclosed herein.

Keeping uncoated pellet density optimally low by preventing shrinkage by drying the pellets as quickly as possible after extrusion help produce a coated pellet that also has a desirably low density prior to coating that produce coated pellets that are advantageously lightweight yet still highly absorptive. Such low density coated pellets advantageously are well suited for use as cat litter, producing litter having a density less than one-half that of conventional clay-based or bentonite litters. This means that a litter made of such low density coated pellets advantageously weighs less than one-half that of convention clay-based or bentonite litters per a given volume.

Where the extruded liquid-absorbent pellets are formulated for liquid absorbent use in an uncoated pellet form well suited for cat litter use, uncoated liquid-absorbent pellets are dried in a drying step performed during pellet transport away from the extruder that advantageously minimizes pellet shrinkage helping to keep uncoated pellet density between 20 pounds per cubic feet and 50 pounds per cubic feet. In one such preferred method implementation, the drying step is performed during uncoated extruded pellet transport produces uncoated liquid-absorbent pellets, including uncoated liquid-absorbent pellets formed by superheated or adiabatic extrusion, which have an uncoated pellet density of between 20 pounds per cubic feet and 35 pounds per cubic feet that are also well suited for use as litter. One such uncoated liquid-absorbent pellet well suited for use as litter has an uncoated pellet density of between 25 pounds per cubic feet and 32 pounds per cubic feet after the drying step is performed during transport of the pellets away from the extruder as well as through at least part of the pneumatic conveyor conduit during the transport step.

In a second preferred method implementation, a cooling step can be performed while extruded liquid-absorbent pellets are transported during the transport step. In carrying out such a method implementation where a cooling step is performed, pellet cooling can be performed in carrying out such a cooling step during pellet transport in the pneumatic conveyor duct through at least a portion of the duct extending downstream of the duct intake. In one second preferred method implementation, drying and cooling are performed during the transport step with the cooling step preferably performed during at least part of the drying step.

Where a cooling step is performed during pellet transport, cooling of the extruded liquid-absorbent pellets can also help prevent post-extrusion pellet shrinkage or densification helping to keep pellet density desirably low in accordance with the maximum densities and preferred density ranges discussed above. Where a cooling step is performed during transport in a second method implementation where a pellet drying step also is performed, the combination of pellet drying and pellet cooling carried out during pellet transport can advantageously work together, such as synergistically, to minimize post-extrusion pellet shrinkage or densification helping to keep pellet density less than the maximum densities and preferably within the preferred density ranges discussed above.

Where a cooling step is performed during pellet transport, each granule or pellet preferably is cooled at least 10 degrees Celsius and preferably at least 15 degrees Celsius during pellet transport. In a preferred cooling step, each granule or pellet preferably is cooled at least 15 degrees Celsius to a temperature that is within 10 degrees Celsius of room temperature, e.g., within 10 degrees Celsius of 23 degrees Celsius.

In a third preferred method implementation, a surface preparation step is performed during transport of the liquid-absorbent pellets during the transport step. Such a surface preparation step can be performed to help increase absorption and/or improve absorption characteristics of the pellets. Where the pellets are intended to be coated, performing such a surface preparation step helps prepare the pellets for being coated. Carrying out such a surface preparation step during pellet transport helps prepare an outer surface of the pellets by removing projections and other surface discontinuities therefrom reducing pellet surface roughness.

A preferred surface preparation or surface treatment step abrades pellets of granular absorbent being transported through the duct of the pneumatic conveyor via contact with other pellets and/or an interior surface of the duct during transport producing fines of granular absorbent that are smaller in size than the pellets. Such an interior surface of the duct can be ribbed or otherwise three-dimensionally contoured, e.g., roughened, to help abrade pellets during transport through the duct.

In a preferred surface treatment or preparation step, the pellet-abrading interior surface of the granule or pellet transport conduit of the pneumatic conveyor produces fines by breaking pieces off of the granular absorbent granules or pellets being transported through the pneumatic conveyor conduit that are smaller in size than each one of the granules or pellets being transported. In one preferred surface treatment or preparation step, uncoated granules or pellets are used such that the fines produced are granular absorbent fines formed by the pellet abrading interior surface of the pneumatic conveyor conduit breaking pieces of granular absorbent off of uncoated granules or pellets of granular absorbent pellets being transported through the conduit.

In one such preferred surface preparation method step implementation, the surface preparation step is performed during the transport step preferably while at least one other processing step is carried out during the transport step. In one surface preparation method step implementation, a drying step, such as a drying step in accordance with that described herein, is carried out during a transport step where a surface preparation step also is carried out. In one such surface preparation method step implementation, the surface preparation step is carried out during the drying step. In one such surface preparation method step implementation, the surface preparation step is carried out during a transport step where both a drying step and a cooling step are also carried out.

Removing projections and surface discontinuities from pellets during surface preparation produces pellets having a more uniform outer surface that coats more uniformly with a coating material advantageously enabling a lesser amount of coating material to be used during pellet coating. Removing such projections and surface discontinuities from pellets during the surface preparation step also forms openings or pores in the pellets improving pellet absorption.

The projections and surface discontinuities removed from pellets during the surface preparation step produce fines of granular absorbent that are smaller in size than the pellets. In a preferred surface preparation method step implementation, liquid-absorbent fines are produced that have a size no greater than one-tenth average pellet size.

In a method of making a preferred granular absorbent product, the fines produced during the surface preparation step are transported with the pellets during the transport step where the fines and pellets are together discharged out the outlet of the pneumatic conveyor duct. Fines remain with the pellets during any subsequent granular absorbent processing steps carried out after discharge from the pneumatic conveyor to produce a granular absorbent product packaged for retail, consumer or commercial sale or use that is a mixture of liquid-absorbent fines and liquid-absorbent pellets.

In one preferred surface preparation method step implementation, carrying out the surface preparation step forms enough fines to produce a preferred granular absorbent product that is a mixture of fines and pellets that contains at least 1% fines by packaged granular absorbent product weight. Whether coated or uncoated, granular absorbent product formed of such a first mixture of liquid-absorbent fines and liquid-absorbent pellets having at least 1% fines by packaged granular absorbent product weight produces a granular absorbent product well suited for liquid absorbent use.

In another preferred surface preparation method step implementation, enough fines are formed to produce a liquid-absorbent granular absorbent product having at least 10% fines and preferably at least 15% by packaged granular absorbent product weight. In still another preferred surface preparation method step implementation, enough fines are formed to produce a liquid-absorbent granular absorbent product having between 5% and 35% fines, preferably between 10% and 30%, and more preferably between 15% and 25% fines, by packaged granular absorbent product weight. Such preferred granular absorbent products are particularly well suited for use as cat litter because the mixture of liquid-absorbent fines and liquid-absorbent pellets clump together when wetted by water, urine and/or liquid fecal matter to form clumps of pellets and fines that remain on top of a litter box filled with the granular absorbent product. In addition, the clumps of pellets and fines that form when wetted advantageously have a clump width and/or clump length greater than clump depth enabling the clumps to be easily scooped from a litter box filled with the granular absorbent product.

In a fourth preferred method implementation, a coating step is performed during the transport step where liquid-absorbent pellets are at least partially coated with a coating material during transport. In one preferred coating step method implementation, a coating step is performed during a transport step where a drying step also is performed. In another preferred coating step method implementation, a coating step is performed during a transport step where a surface preparation step also is performed. In still another preferred coating step method implementation, a coating step is performed during a transport step where a drying step and a surface preparation step are also performed. In a further preferred coating step method implementation, a coating step is performed during a transport step where a drying step, a cooling step, and a surface preparation step are also performed.

In a preferred coating method step implementation, carrying out the coating step also dries and/or facilitates surface preparation such that at least part of the coating step and drying and/or surface preparation steps can be carried out substantially simultaneously during the transport in such a method implementation. In one such coating method step implementation, carrying out the coating step helps dry the liquid-absorbent pellets during transport of the pellets during the transport step.

In one preferred coating step, coating material is applied during transport of the pellets while the pellets still have a tacky or moist outer pellet surface after extrusion such that the tacky outer pellet surface facilitates adhesion of the coating material onto each pellet while tacky. In such a preferred coating step, applying coating material during transport while the pellets are still tacky not only uses the stickiness of the tacky outer pellet surface to adhere the coating to each pellet during transport, adherence of the coating material to the tacky outer surface of each pellet during transport also advantageously dries each pellet. In another preferred coating step, pellets are wetted during transport causing the pellets to become tacky enough for coating material to stick to or adhere to the tacky outer pellet surface during pellet transport.

A preferred coating material is a granular coating material containing at least one smectite, such as absorbent clay, preferably bentonite, such as sodium bentonite and/or calcium bentonite. Such a liquid-absorbent pellet coating formulation is well suited for use in a broad range of granular absorbent product applications including cat litter. Where the coating material is intended for cat litter use, the granular coating material can further include one or more of a zeolite, sodium bicarbonate, sodium carbonate, sodium chloride, calcium bicarbonate, calcium carbonate, calcium chloride, silica, e.g., crystalline silica, an anti-bacterial agent, an anti-fungal agent, and/or an anti-parasitic agent, if desired.

In a preferred coating method step implementation, such a granular coating material is applied to liquid-absorbent pellets immediately upon being extruded from an extruder during the transport step when the extruded pellets are being transported away from the extruder. Where the extruded pellets are puffed or expanded pellets, such as when extruded during superheated and/or adiabatic extrusion conditions, applying granular coating material onto the moist pellets within no more than a second or two after being extruded helps facilitate adhering at least some coating material to the freshly extruded pellets.

Where the granular coating material is dry enough, application of granular coating material to moist pellets within no more than a second or two after being extruded not only helps adhere at least some coating material to the freshly extruded pellets, the coating material also helps dry the freshly extruded pellets by absorbing at least some pellet moisture. Helping to begin drying of the freshly extruded pellets within a second or two of being extruded advantageously helps minimize pellet shrinkage thereby advantageously helping to keep pellet density optimally low to produce a relatively lightweight low-density coated granular absorbent product.

Where the extruded pellets contain water-soluble binder, such as a starch-based or starch-containing binder, e.g., dextrin, binder present in the moist outer surface of the freshly extruded pellets provides a tacky outer pellet surface to which particles of granular coating material readily adhere to when beginning the coating step immediately after extrusion. As particles of granular coating material adhere to the tacky outer pellet surface, the particles not only absorb pellet moisture, at least some particles also bond and/or at least partially absorb some of the binder present in the outer pellet surface. During pellet drying, including during application of granular coating material during the coating step, the binder can set causing adhered particles of coating material to become more tightly adhesively attached.

During such a coating step where particles of granular coating material are applied to pellets while the pellets are moist or even wet, at least one coating layer begins to form that at least partially coats pellets with the coating layer composed of binder and coating material particles. This produces a coating that at least partially coats pellets during the coating step that is formed of at least one outer water-soluble binder resin layer in which particles of coating material are embedded, bonded and/or partially absorbed. As a result of being at least partially coated with at least one coating layer formed of binder resin in which coating layer particles are embedded, bonded, and/or partially absorbed, wetting of the outer surface of an at least partially coated pellet causes binder in the at least one coating layer to solubilize enabling additional coating material to be applied to further coat the pellets. When at least partially coated and preferably substantially completely coated with at least one coating layer formed of liquid-soluble binder resin and coating material, the coated pellets produce a granular absorbent product whose coated pellets readily self-clump together when wetted that is well suited for use as cat litter.

A preferred system for carrying out a method of processing granular absorbent that coats granular absorbent during transport includes a coating material delivery system having a coating material container that holds coating material along with at least one coating material delivery conduit that delivers coating material to granular absorbent being transported to at least partially coat granular absorbent during transport. One preferred coating material delivery system has a tank or hopper configured to hold granular coating material with at least one coating material delivery conduit configured to deliver granular coating material to liquid-absorbent pellets during transport of the pellets by the pneumatic conveyor. In one such preferred coating material delivery system, at least one coating material delivery conduit delivers granular coating material to a location adjacent the discharge of the extruder to at least partially begin coating pellets immediately after being extruded and preferably within no more than a second or two after being extruded.

Where the pneumatic conveyor duct inlet is disposed close enough to the discharge of the extruder to transport substantially completely all of the pellets extruded by the extruder during extruder operation, at least one coating material delivery conduit can be provided with a discharge or nozzle disposed adjacent the duct inlet to deliver granular material onto pellets as they are extruded and while the freshly extruded pellets are being transported by the pneumatic conveyor into the duct inlet. Excess granular coating material that did not coat the freshly extruded pellets enters the duct inlet with the pellets where both are transported together in the duct enabling pellets to be coated with any excess granular coating material during transport through the duct during the transport step.

Where the pneumatic conveyor duct inlet is in fluid-flow communication with an extruder discharge chamber disposed at the discharge end of the extruder, at least one coating material delivery conduit can be provided in fluid-flow communication with the discharge chamber having a discharge or nozzle disposed adjacent the extruder discharge to deliver granular coating material onto pellets as they are extruded and as the pellets are being transported by the pneumatic conveyor into the duct inlet. Excess granular coating material that did not coat the freshly extruded pellets enters the duct inlet with the pellets where both are transported together in the duct enabling pellets to be coated with any excess granular coating material during transport through the duct during the transport step.

If desired, at least one coating material delivery conduit of such a coating material delivery system can be in fluid-flow communication with the duct inlet and/or with the duct adjacent the inlet but downstream thereof to deliver granular coating material at the duct inlet and/or adjacent the duct inlet but downstream of the duct inlet. If desired, such a coating material delivery system constructed in accordance with the present invention can have a plurality of coating material delivery conduits with one or more configured to deliver granular coating material into the pneumatic conveyor duct at one or more spaced apart locations downstream of the duct inlet. This enables additional granular coating material to be added to pellets being transported in the pneumatic conveyor duct to further coat the pellets during such a coating step that is carried out during transport through the duct during the transport step.

In a fifth preferred method implementation, a wetting step is performed during the transport step where liquid-absorbent pellets are at least partially wetted with a wetting liquid during transport. Such a wetting liquid can include water and can also include one or more pellet treatment materials, including one or more pellet treatment materials used to apply a scent, a flavor, an odor mask, an odor inhibitor, an anti-bacterial agent, an anti-fungal agent, and/or an anti-parasitic agent. In at least one wetting liquid used when a wetting step is carried out during or after a coating step to help facilitate coating of the pellets during the transport step, the wetting liquid can be or otherwise include water. In one preferred wetting step carried out during or after a coating step, the wetting liquid can include water and one or more of the aforementioned pellet treatment materials.

In another preferred wetting step, wetting liquid can include a binder, such as a water-soluble adhesive, which is also applied to the pellets being wetted during the wetting step. Suitable water-soluble binders that can be mixed into and applied with wetting liquid during the wetting step onto the pellets include starch-based or starch-containing water-soluble binders, dextrin, dextrin containing binders, dextrin-based binders, water-soluble bioadhesives, and/or other suitable water-soluble binders. In such a wetting step that includes application of a water-soluble adhesive mixed with the wetting liquid, the wetting liquid mixture can also include one or more pellet treatment materials used to apply a scent, a flavor, an odor mask, an odor inhibitor, an anti-bacterial agent, an anti-fungal agent, and/or an anti-parasitic agent such as described above.

In one preferred wetting step method implementation, a wetting step is performed during a transport step after a drying step has begun to be performed. In another preferred wetting step method implementation, a wetting step is performed during or after a cooling step has begun to be performed. In still another preferred wetting step method implementation, a wetting step is performed during the transport step after a coating step has begun to be performed and can be performed while the surface preparation step is performed.

A preferred system for carrying out a method of processing granular absorbent that wets granular absorbent during transport includes a wetting liquid delivery system having a wetting liquid container that holds wetting liquid along with at least one wetting liquid delivery conduit that delivers wetting liquid to granular absorbent being transported to at least partially wet granular absorbent during transport. One preferred wetting liquid delivery system has a tank or other container configured to hold wetting liquid with at least one wetting liquid delivery conduit configured to deliver wetting liquid to liquid-absorbent pellets during transport of the pellets by the pneumatic conveyor. In one such preferred wetting liquid delivery system, at least one wetting liquid delivery conduit delivers wetting liquid to a location downstream of the discharge of the extruder to at least partially wet pellets more than a second or two after being extruded.

At least one wetting liquid delivery conduit can be provided with a dispenser, discharge or nozzle disposed adjacent the duct inlet to deliver wetting into the duct inlet as pellets are entering the duct inlet. A plurality of wetting liquid delivery conduits can be provided to deliver wetting liquid in the conduit during pellet transport at a plurality of longitudinally or axially spaced apart locations along the duct. Excess wetting liquid not immediately wetting pellets being transported in the duct is transported in the duct together with the pellets where the excess liquid can contact and wet pellets during transport through the duct.

Where a wetting step is being performed in conjunction with a coating step, wetting liquid preferably is delivered to the conduit downstream of a location where coating materiel is delivered. Where coating material is delivered at a plurality of spaced apart locations, such as at one location adjacent the extruder discharge and another location in the pneumatic conveyor duct, the wetting liquid delivery system preferably is configured with a plurality of wetting liquid delivery conduits with one of the wetting liquid delivery conduits delivering wetting liquid into the duct downstream of where coating material is introduced adjacent the extruder discharge and another one of the wetting liquid deliver conduits delivers wetting liquid into the duct downstream of where coating material is delivered into the duct.

Where a wetting step is performed in conjunction with a coating step during pellet transport, coating material is first applied onto pellets being transported before wetting liquid is applied as needed to wet at least partially coated pellets to solubilize the outer binder resin layer enough to tackify the outer pellet surface enabling additional coating material to be delivered to adhere to the tacky outer pellet surface to further coat the pellet. Such coating and wetting steps can be repeated and/or alternated as needed to increasingly further coat pellets as they are transported by the pneumatic conveyor during the transport step thereby building up the pellet coating with additional layers of coating material and/or resin binder and/or making thicker at least one coating layer.

In summary, in one preferred pneumatic conveyor pellet transport and processing system, as the moisture content of the freshly extruded moist pellets of granular absorbent is reduced, the overall size and overall shape of each pellet is retained, including after performing any surface preparation, e.g., abrasive polishing, of the pellets. This is particularly important to help produce a desirably low density finished granular absorbent product whether the pellets are coated or used in uncoated form. This is particularly important because reducing the moisture content of the pellets of granular absorbent in a controlled manner within a desired moisture content range, such as a moisture content range of between 5% and 15% and preferably between 7% and 13%, control of the density of the finished absorbent product is thereby achieved. As a result, the profitability of a preferred granular absorbent product well suited for use as cat litter is maximized by the production of a low density granular absorbent by controlling pellet moisture content. Carrying out a surface preparation step, e.g., abrasive polishing step, before and/or in conjunction with drying of the granular absorbent also helps control final absorbent product density where coated to keep it desirably low as abrasive surface preparation helps minimize the amount of coating applied to each pellet of the granular absorbent product. Similarly, such low density granular absorbent control can be and preferably also is employed to produce a low density granular absorbent used in oil spill remediation that advantageously allows for higher loading of the granular absorbent with heavier molecular weight surfactants and/or oil treatment materials without the granular absorbent product losing buoyancy in water (whether coated or uncoated).

These and other objects, features and advantages of this invention will become apparent from the following detailed description of the invention and accompanying drawings.

DRAWING DESCRIPTION

One or more preferred exemplary embodiments of the invention are illustrated in the accompanying drawings in which like reference numerals represent like parts throughout and in which.

Figure 5A:
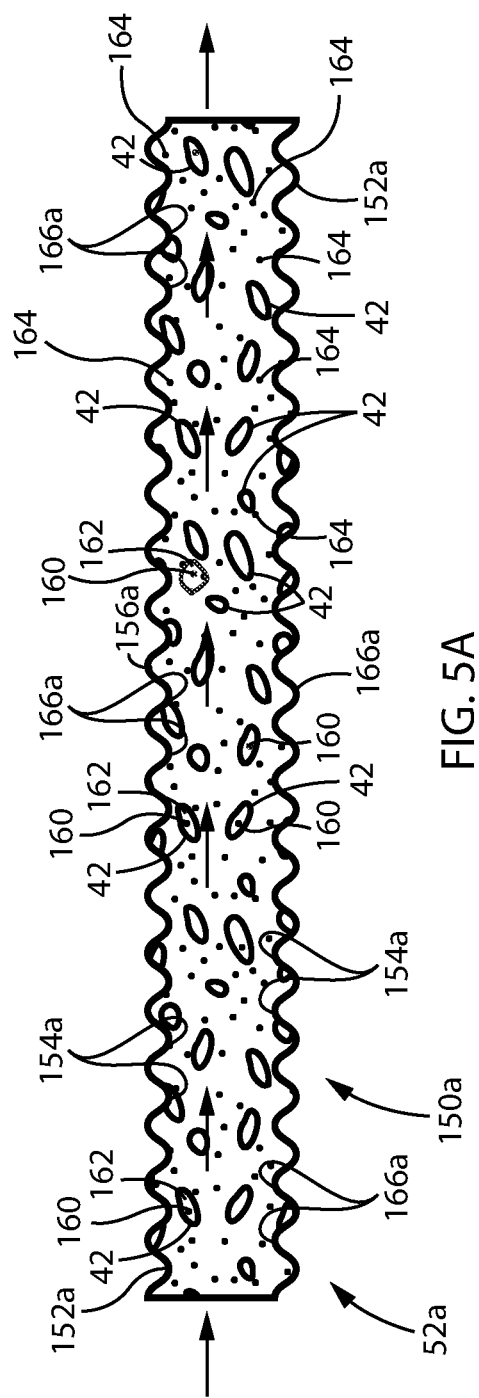
FIG. 5A illustrates a first preferred but exemplary section of duct or ductwork of a pneumatic conveyor in which uncoated granular absorbent pellets carried in air flowing through the duct abrasively treats the pellets in carrying out a preferred pellet outer surface treatment method forming a plurality of pairs of smaller sized fines of granular absorbent during pellet transport.
Figure 5B:
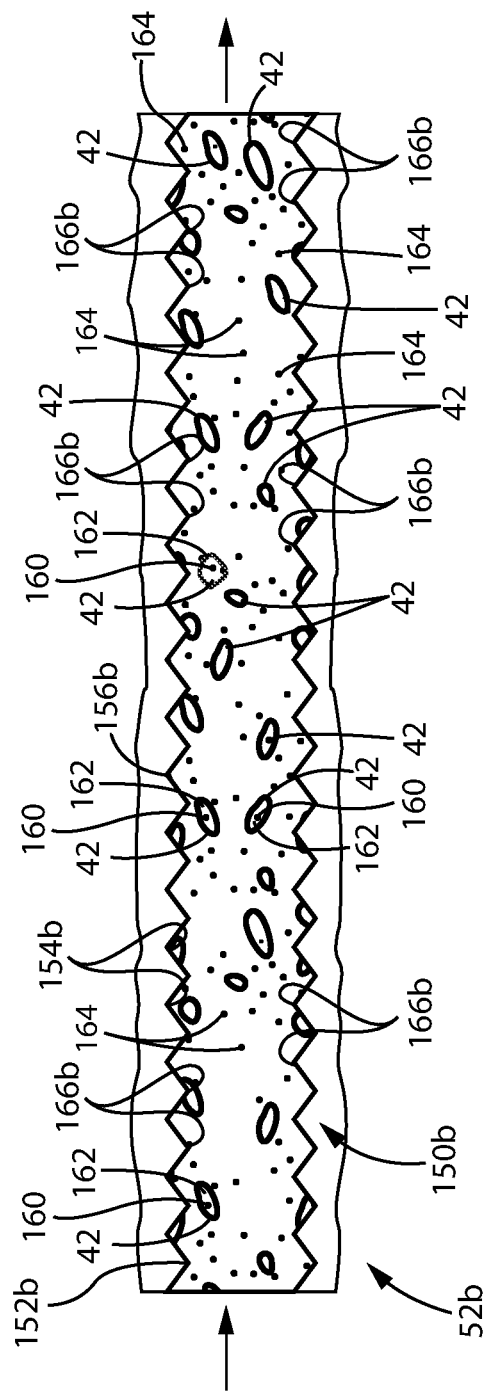
FIG. 5B illustrates a second preferred but exemplary section of duct or ductwork of a pneumatic conveyor in which uncoated granular absorbent pellets carried in air flowing through the duct abrasively treats the pellets in carrying out another preferred pellet outer surface treatment method that forms a plurality of pairs of smaller sized fines of granular absorbent during pellet transport.

FIG. 6A illustrates the first preferred but exemplary elongate section of pneumatic conveyor duct or ductwork of FIG. 5A depicting flow of uncoated granular absorbent pellets and particles of coating material entrained in air flowing through the duct forming fines in carrying out still another preferred pellet outer surface treatment method where the pellets are at least partially coated with the coating material while absorbent fines are formed; and FIG. 6B illustrates the second preferred but exemplary elongate section of duct or ductwork of FIG. 5B depicting flow of uncoated granular absorbent pellets and particles of coating material entrained in air flowing through the duct forming fines in carrying out a further preferred pellet outer surface treatment method where the pellets are at least partially coated with the coating material while absorbent fines are formed.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

Figure 1A:
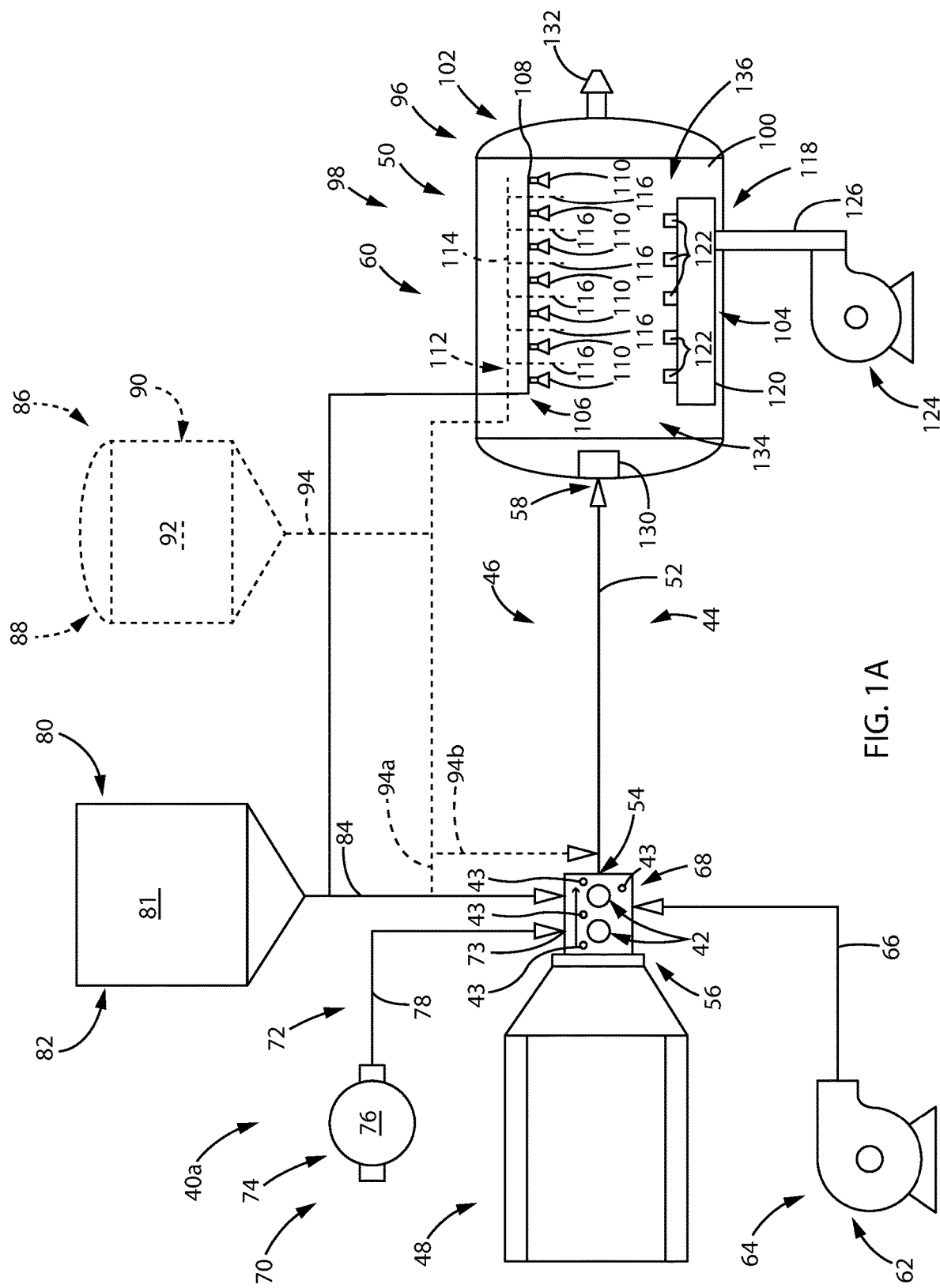
FIG. 1A illustrates a schematic diagram of a first preferred system for treating granular absorbent during granular absorbent transport from an extruder using a pneumatic conveyor.
Figure 1B:
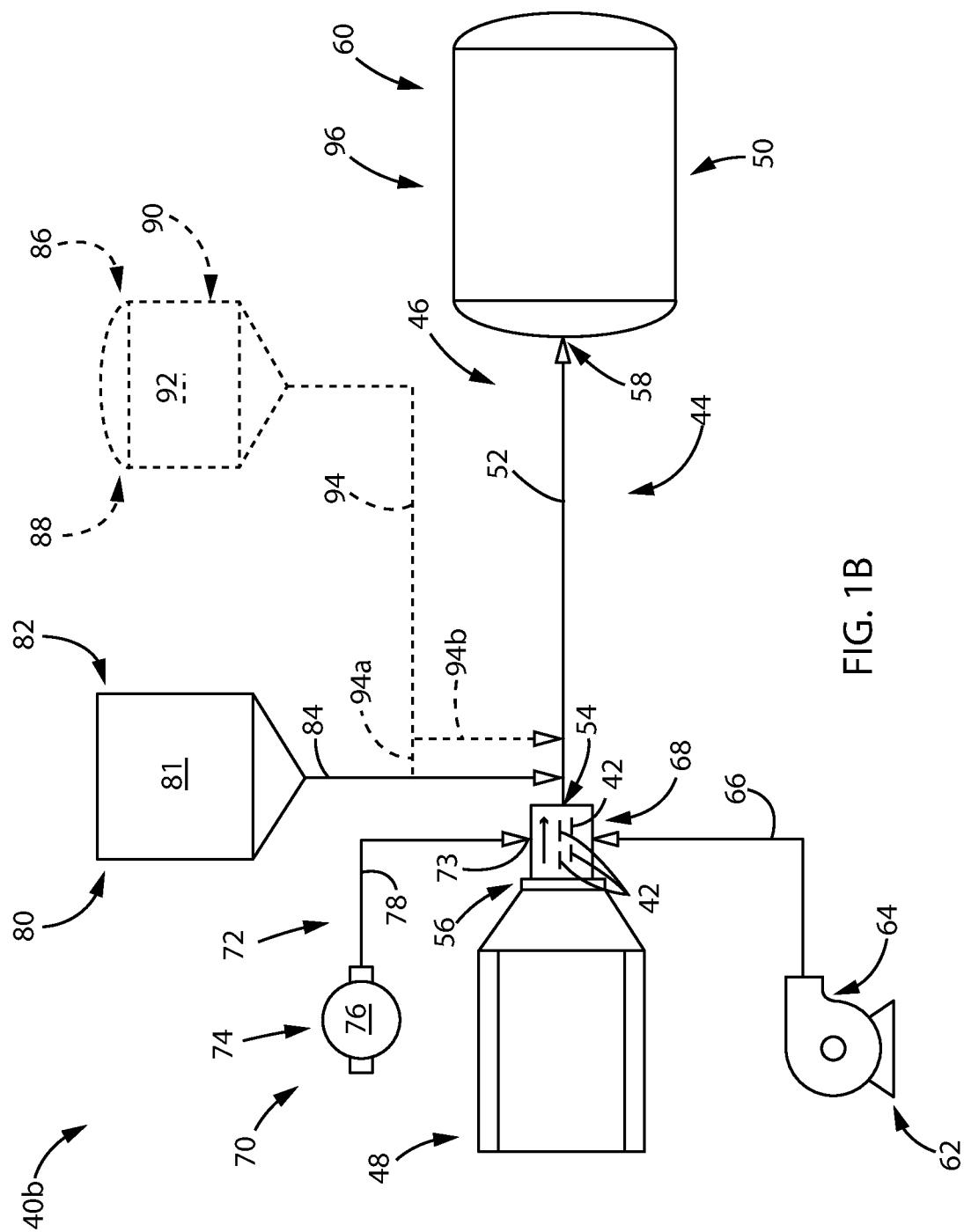
FIG. 1B illustrates a schematic diagram of a second preferred system configured to carry out at least one of a drying step and a surface preparation step during granular absorbent transport from an extruder using a pneumatic conveyor.

With initial reference to FIGS. 1A and 1B, the present invention is directed to a system 40 for treating or processing uncoated granular absorbent 42 preferably with a coating material 43 as the uncoated granular absorbent 42 is being transported or conveyed via a gas transport conveyor 44, preferably a pneumatic conveyor 46, from an extruder 48 that extrudes the uncoated granular absorbent 42 to a location 50 downstream of the extruder 48. As is discussed in more detail below, the pneumatic conveyor 46 has an elongate tubular conduit 52 that extends from the extruder 48 to the downstream location 50 where coating material 43 transported together with granular absorbent 42 in the conduit 52 coats the granular absorbent 42 as the granular absorbent 42 is conveyed by gas, e.g., air, flowing through the conduit 52 toward the downstream location 50.

The extruder 46 is a single screw extruder or twin screw extruder that is configured to (a) gelatinize, melt and/or degrade a starch-based or starch-containing admixture that can include a fiber that can be and/or include insoluble fiber, and (b) extrude the gelatinized admixture forming at least a plurality of pairs, i.e., at least three, of uncoated granules or pellets 42 of a starch-based or starch-containing absorbent. In one preferred granular absorbent, the starch-based or starch-containing admixture is formed of at least one cereal grain that can be mixed with fiber that is extruded by the extruder 46 as an extrudate at a sufficiently high extrusion rate producing at least a plurality of pairs, i.e., at least three, of uncoated absorbent granules or pellets 42 from the extrudate per second when the extrudate discharged from the extruder 46 is cut by a rotary knife or cutter (not shown) of the extruder 46.

One preferred uncoated granular absorbent 42 formed of an extrudate produced from an admixture includes starch-containing corn that can be and preferably is mixed together with at least five percent fiber by total dry admixture weight. The corn can be in the form of whole grain corn and/or degermed corn that can be provided in a ground or comminuted form as corn grits, corn meal, corn flour and/or cornstarch. Where such a granular absorbent forming admixture includes fiber, the fiber can be wood fiber, rice fiber, oat fiber, wheat fiber and/or another type of fiber that contains at least ten percent insoluble fiber by total dry fiber weight of the fiber added to the admixture. Such a fiber containing admixture advantageously produces uncoated granules or pellets 42 of an absorbent material that is well suited for absorbing liquid, the fiber extruded in each absorbent granule or pellet 42 advantageously reinforces each uncoated granule or pellet 42 making each granule or pellet tougher, more resilient, and more able to withstand impact, shear, and wetting of the granules or pellets during coating, other treatment or processing, and/or use of the granular absorbent finished product. Where the granules or pellets 42 are intended to be coated, such as with coating material, e.g., a smectite such as bentonite, the granular or pellets 42 provide a lightweight core that can have at least a plurality of pairs, i.e. at least three, of density reducing voids and/or at least a plurality of pairs, i.e. at least three, of absorption increasing and/or density reducing pores formed therein to which coating material is applied to coat the lightweight cores.

Another preferred uncoated granular absorbent 42 formed from extrudate produced from an admixture includes starch-containing sorghum that can also include at least five percent fiber by total dry admixture weight. One such preferred admixture preferably contains between five percent and thirty percent fiber. Another such preferred admixture contains no more than twenty five percent. The sorghum can be red and/or white sorghum in the form of whole grain sorghum and/or degermed sorghum that can be provided as the admixture and/or added to the admixture in a ground or comminuted sorghum meal, sorghum grits, sorghum flour and/or sorghum starch form. Tannins in such a sorghum-containing admixture form a tannin containing extrudate that is formed into tannin-containing uncoated absorbent granules or pellets 42 advantageously provide the granules or pellets 42 with increased resistance to bacterial growth, fungal growth, yeast growth, and/or virus growth when wetted with liquid. Where such a sorghum-containing admixture also includes fiber, the fiber can be wood fiber, rice fiber, oat fiber, wheat fiber or another type of fiber that contains at least five percent insoluble fiber by total dry fiber weight of the fiber added to the admixture. One preferred admixture contains between five percent and thirty percent insoluble fiber. Another preferred admixture contains between five percent and twenty five percent insoluble fiber.

Granules or pellets 42 extruded from the extruder 46 are absorbent in their uncoated form in that they possess an increased affinity for absorbing a fluid that preferably is a liquid. In one embodiment, at least a plurality of pairs, i.e., at least three, of uncoated liquid absorbent granules or pellets 42 are discharged from the extruder 46 during each second of operation the extruder 46 with each uncoated liquid absorbent granule or pellet 42 having at least a plurality of pairs of pockets or voids (not shown) formed therein that can be air-filled which can and preferably does help increase liquid absorption of each uncoated liquid absorbent granule or pellet 42. Each uncoated absorbent granule or pellet 42 can also be of porous construction with each uncoated granule or pellet 42 having at least a plurality of pairs of pores (not shown) formed in an outer surface (also not shown) of each uncoated absorbent granule or pellet 42. Such uncoated liquid absorbent granules or pellets 42 are advantageously well suited for use in absorbing a plurality of different types of liquids including water, urine, liquid fecal matter, and/or liquefied fecal matter, volatile-containing liquids, hydrocarbon-containing liquids, motor oil, gasoline, diesel fuel, fuel oil, kerosene, crude oil, toxic liquid waste, and/or one or more other types of liquid.

In one uncoated granular absorbent granule or pellet embodiment well suited for use in absorbing urine and/or fecal matter, the extruder 46 is operated within a temperature range and/or pressure range that forms at least some water soluble starch-based binder in each extruded uncoated absorbent granule or pellet 42 producing self-clumping uncoated liquid absorbent granules or pellets 42 that tend to clump, e.g., self-clump, together when wetted with liquid. In one preferred self-clumping granular absorbent granule or pellet embodiment, each uncoated self-clumping liquid-absorbent granule or pellet 42 is composed of at least 7% water soluble starch-based binder by uncoated pellet weight that preferably includes at least 5% cold water soluble starch binder by uncoated pellet weight. In another preferred self-clumping granular absorbent granule or pellet embodiment, each uncoated self-clumping liquid-absorbent granule or pellet 42 is composed of at least 15% water soluble starch-based binder by uncoated pellet weight that preferably includes at least 10% cold water soluble starch binder by uncoated pellet weight. In yet another preferred self-clumping granular absorbent granule or pellet embodiment, each uncoated self-clumping liquid-absorbent granule or pellet 42 has at least 15% cold water soluble starch binder by uncoated pellet weight.

In one such uncoated self-clumping liquid-absorbent granule or pellet embodiment, at least some, preferably at least 1%, of the water soluble starch-based binder of each uncoated self-clumping liquid-absorbent granule or pellet 42 is dextrin by uncoated pellet weight. In one dextrin-containing uncoated granular absorbent granule or pellet embodiment well suited for use in absorbing urine and/or fecal matter, the extruder 46 is operated within a temperature range and/or pressure range that causes dextrinization to occur during extrusion forming at least 2% liquid soluble dextrin by pellet weight in each uncoated extruded absorbent granule or pellet 42 thereby producing self-clumping liquid absorbent granules or pellets 42 that self-clump together when wetted with liquid.

Each uncoated absorbent granule or pellet 42 can be round or spherical having a width or diameter of no greater than 6 millimeters and a length, such as where not round or spherical, of no greater than about 6 millimeters. In one uncoated absorbent granule or pellet embodiment, each uncoated absorbent granule or pellet 42 has a width or diameter of no greater than about 6 millimeters (5 millimeters±25%) and has a length or thickness, where not round or spherical, of no greater than about 3 millimeters (two millimeters±25%). In one preferred uncoated absorbent granule or pellet embodiment, each uncoated absorbent granule or pellet 42 has a width or diameter of no greater than 5 millimeters and a thickness of no greater than 2 millimeters with each uncoated absorbent granule or pellet 42 having at least one of a disc or disk shape, a cupped or concave disc or disk shape, a half-moon shape, a football shape, and/or a shaped like a flake. In one preferred uncoated absorbent granule or pellet embodiment, each uncoated granule or pellet 42 is a flake or shaped like a flake with each such uncoated absorbent flake having a width or diameter between 1 millimeter and 4.5 millimeters and a thickness of between ¼ millimeter and 2 millimeters. In another preferred uncoated absorbent granule or pellet embodiment, each uncoated granule or pellet 42 is a flake or shaped like a flake with each such uncoated absorbent flake having a width or diameter between 1.5 millimeters and 4 millimeters and a thickness of between ¼ millimeter and 1.75 millimeters. Each such uncoated absorbent flake, e.g., flake-shaped granule or pellet 42, can be generally circular, generally semi-circular, and/or generally half-moon shaped, football shaped, and can also be generally flat, generally dish-shaped, generally concave, and/or generally cupped.

In one uncoated granular absorbent granule or pellet embodiment well suited for use in absorbing liquid that can be extruded as uncoated absorbent flakes and/or uncoated generally flake-shaped granules or pellets 42, each such uncoated liquid-absorbent flake, granule or pellet preferably is coated with at least one layer of a coating material 43 that preferably is a granular coating material 43 having a composition configured to increase liquid absorption, treat absorbed liquid, and/or time delay release or delivery of a treatment contained within the inner granule or pellet 42 coated with coating material 43, while substantially completely encapsulating each granule or pellet 42 with an outer layer of coating material 43. Such a coating material 43 can be formed of and/or otherwise include a smectite, such as a smectite formed at least in part by or of a clay, which can be a bentonite clay, such as a sodium bentonite, calcium bentonite and/or another similar clay or clay-like material containing Montmorillonite. Such a coating material 43 can further include one or more of the following: carbonate, e.g., calcium carbonate and/or sodium carbonate, bicarbonate, e.g., calcium bicarbonate and/or sodium bicarbonate, salt, e.g., sodium chloride and/or calcium chloride, silica, e.g., crystalline silica or quartz, and/or a zeolite, a binder, a scent, an odor inhibitor, an antifungal, an anti-parasitic, and/or another constituent. Where the coating material includes a binder, it preferably is in a dried granular, e.g., powdered, form that is easily mixed with the rest of the coating material constituents disclosed herein. Where the coating material includes a binder, the binder can be a gum, such as guar gum, an acrylic, an acrylic-based binder, an acrylic-containing binder, a starch-based or starch-containing binder, a dextrin binder, a dextrin-based or dextrin-containing binder, a bioadhesive, or another binder that can be included, e.g., mixed with coating material that is applied to granules or pellets 42 during the coating step at least partially coating the granules or pellets 42 with a coating material containing binder that facilitates or enables self-clumping of a plurality of granules or pellets 42 when wetted during absorbent use. Such binders preferably are mixed with the other coating material constituents in granular form, preferably dry granular form, and can be in powdered form, including where the coating material is provided in a powdered form, such as in accordance with that disclosed herein.

Such a coating material 43 preferably is applied to each absorbent granule or pellet 42 to substantially completely coat or encapsulate each granule or pellet 42 with at least one outer coating or layer of the coating material 43 that is at least one mil thick. In another coating embodiment, a coating material 43 that preferably is a granular coating material 43 made of at least a plurality of pairs, i.e., at least three, particles 43 of the granular coating material 43 that preferably is applied to each absorbent granule or pellet 42 to substantially completely coat or encapsulate each granule or pellet 42 with an outer coating or layer of the coating material 43 that is at least one micron thick. Such an outer layer or coating of coating material 43 preferably is formed of a granular coating material 43 formed of a plurality of pairs of granules or particles 43 each having a width or diameter less than one-tenth the average width or diameter of the uncoated absorbent granules or pellets 42 extruded by the extruder 48.

One such preferred granular coating material 43 is a powdered coating material 43. One such preferred powdered coating material 43 has at least a plurality of coating material particles 43 with a mesh size of between 20 mesh (U.S.) and 325 mesh (U.S.). One preferred powdered coating material 43 has a mesh size of at least 70 mesh (U.S.). Another preferred powdered coating material 43 has at least one half of the particles of powdered coating material 43 having a mesh of between 170 mesh (U.S.) and 230 mesh (U.S.).

One such preferred extruded granular absorbent is extruded forming liquid-absorbent pellets 42 composed of a starch-based or starch-containing material and/or fiber that preferably includes insoluble fiber, e.g., cellulose. Whether coated as described herein or uncoated, the liquid-absorbent pellets 42 preferably include binder in an amount sufficient in each pellet 42 to cause pellets 42 to readily clump together when wetted by a liquid, such as water, urine, liquid fecal matter, or another waste or toxic liquid, thereby producing self-clumping liquid-absorbent pellets. Such a binder can be, but is not limited to, a starch-based or starch-containing bioadhesive such as cold water soluble starch binder, dextrin and/or a combination thereof, and/or a synthetic adhesive, such as an acrylic adhesive, which is carried by, e.g., coated, and/or disposed in each pellet 42 in an amount sufficient to produce self-clumping liquid-absorbent pellets. The binder can be or include a cold water soluble starch binder extruded in each pellet 42 during granular absorbent extrusion and/or which is applied to the pellets 42 after extrusion. In a preferred embodiment, the binder can be or include a cold water soluble starch binder formed from starch in the admixture during extrusion that is formed in each pellet 42.

One such preferred granular absorbent is formed of extruded liquid-absorbent pellets 42, extruded such as described herein, which can be uncoated or coated (such as in the manner described herein), possessing binder in an amount sufficient to produce clumps when wetted by liquid, such as water, urine, liquid fecal matter, or another waste or toxic liquid, formed of at least a plurality of pairs, i.e., at least three, of pellets 42 in each clump with each clump possessing at least 90% clump retention, preferably determined via standardized cat litter clump retention testing, and/or having a crush or compressive strength of at least 25 pounds per square inch (PSI) and preferably at least 40 PSI when the clump is substantially dry (i.e., has between 10% and 15% moisture by clump weight). Another such granular absorbent is formed of coated or uncoated liquid-absorbent pellets 42 having binder in an amount sufficient to produce clumps when wetted during use as a liquid absorbent that possesses at least 92% clump retention and which also have a crush or compressive strength of at least 45 PSI after and/or when the clump is substantially dry (i.e., has between 10% and 15% moisture by clump weight). Still another such granular absorbent is formed of coated or uncoated liquid-absorbent pellets 42 having binder in an amount sufficient to produce clumps when wetted during use as a liquid absorbent that possesses at least 95% clump retention and which also have a crush or compressive strength of at least 50 PSI when the clump is substantially dry. Yet another such granular absorbent is formed of coated or uncoated liquid-absorbent pellets 42 having binder in an amount sufficient to produce clumps when wetted during use as a liquid absorbent that possesses at least 90% clump retention and which also have a crush or compressive strength of at least 65 PSI when the clump is substantially dry. Still yet another such granular absorbent is formed of coated or uncoated liquid-absorbent pellets 42 having binder in an amount sufficient to produce clumps when wetted during use as a liquid absorbent that possesses at least 95% clump retention and which also have a crush or compressive strength of at least 65 PSI when the clump is substantially dry.

Another such preferred granular absorbent is formed of liquid-absorbent pellets 42 extruded as described herein with the pellets 42, whether uncoated or coated (such as in the manner described herein), having water-soluble binder in an amount sufficient to self-clump when wetted by liquid, such as when wetted by water, urine, liquid fecal matter, or another waste or toxic liquid, producing clumps of pellets possessing at least 90% clump retention and/or having a crush or compressive strength of at least 25 PSI and preferably at least 40 PSI when the clump is substantially dry. One such preferred granular absorbent formed of coated or uncoated liquid-absorbent water-soluble binder-containing extruded pellets 42 have an amount of such binder sufficient to produce clumps when wetted that possess at least 92% clump retention and have a crush or compressive strength of at least 45 PSI when the clump is substantially dry. Another such preferred granular absorbent formed of coated or uncoated liquid-absorbent water-soluble binder-containing extruded pellets 42 have an amount of such binder sufficient to produce clumps when wetted that possess at least 95% clump retention and have a crush or compressive strength of at least 50 PSI when the clump is substantially dry. Yet another such preferred granular absorbent formed of coated or uncoated liquid-absorbent water-soluble binder-containing extruded pellets 42 have an amount of such binder sufficient to produce clumps when wetted that possess at least 90% clump retention and have a crush or compressive strength of at least 65 PSI when the clump is substantially dry. Still yet another such preferred granular absorbent formed of coated or uncoated liquid-absorbent water-soluble binder-containing extruded pellets 42 have an amount of such binder sufficient to produce clumps when wetted that possess at least 90% clump retention and have a crush or compressive strength of at least 65 PSI when the clump is substantially dry. In at least one such embodiment, each extruded pellet 42 contains at least 10% water soluble binder. In another such embodiment, each extruded pellet 42 contains at least 15% water soluble binder. In still another embodiment, each extruded pellet 42 contains at least 20% water soluble binder. In still another embodiment, each extruded pellet 42 contains at least 25% water soluble binder. In a further embodiment, each extruded pellet 42 contains at least 30% water soluble binder.

Still another such preferred granular absorbent is formed of liquid-absorbent pellets 42 extruded as described herein forming pellets 42, whether uncoated or coated (such as described herein), having cold water soluble starch binder in an amount sufficient to self-clump when wetted by liquid, such as water, urine, liquid fecal matter, or another waste or toxic liquid, producing clumps possessing at least 90% clump retention and/or having a crush or compressive strength of at least 25 PSI and preferably at least 40 PSI when the clump is substantially dry. Another such preferred granular absorbent formed of coated or uncoated liquid-absorbent water-soluble bioadhesive binder-containing pellets 42 have an amount of such binder sufficient to produce clumps when wetted possessing at least 92% clump retention and having a crush or compressive strength of at least 45 PSI when the clump is substantially dry. Still another such preferred granular absorbent formed of coated or uncoated liquid-absorbent cold water-soluble bioadhesive binder-containing pellets 42 have an amount of such binder sufficient to produce clumps when wetted possessing at least 95% clump retention and having a crush or compressive strength of at least 50 PSI when the clump is substantially dry. Yet another such preferred granular absorbent formed of coated or uncoated liquid-absorbent water-soluble bioadhesive binder-containing pellets 42 have an amount of such binder sufficient to produce clumps when wetted possessing at least 90% clump retention and having a crush or compressive strength of at least 65 PSI when the clump is substantially dry. Still yet another such preferred granular absorbent formed of coated or uncoated liquid-absorbent water-soluble bioadhesive binder-containing pellets 42 have an amount of such binder sufficient to produce clumps when wetted possessing at least 95% clump retention and having a crush or compressive strength of at least 65 PSI when the clump is substantially dry. In at least one such embodiment, each extruded pellet 42 contains at least 10% water soluble binder by uncoated pellet weight. In another such embodiment, each extruded pellet 42 contains at least 15% water soluble binder by uncoated pellet weight. In still another embodiment, each extruded pellet 42 contains at least 20% water soluble binder by uncoated pellet weight. In still another embodiment, each extruded pellet 42 contains at least 25% water soluble binder by uncoated pellet weight. In a further embodiment, each extruded pellet 42 contains at least 30% water soluble binder. In a still further embodiment, each extruded pellet 42 contains at least 35% water soluble binder by uncoated pellet weight.

A first preferred embodiment of a granular absorbent conveyor and coating system 40a is shown in FIG. 1A that includes a gas transport conveyor 44 that preferably is a pneumatic conveyor 46 having an elongate tubular conduit 52 through which at least a plurality of pairs, i.e., at least three, uncoated granules or pellets 42 extruded per second from the extruder 48 are transported via gas, e.g., air, flowing through the conduit 52 to a location 50 remote from the extruder 48 that preferably is a granular absorbent handling and/or processing station 60 located downstream of the extruder 48. The granules or pellets 42 travel through the conduit 52 together with coating material 43 at least partially coating the granules or pellets 42 with coating material 43 as both travel through the conduit 52. The pneumatic conveyor conduit 52 has an inlet or intake 54 disposed at or adjacent one conduit end that is in fluid-flow communication with a discharge end 56 of the extruder 48. The conduit 52 has an outlet or discharge 58 disposed at or adjacent an opposite conduit end that can be in fluid-flow communication with a granular absorbent handling and/or processing station 60 disposed at the location 50 remote or downstream of the extruder 48.

A gas mover 62, such as in the form of a pump, compressor or blower 64, is in gas-flow communication with the conduit 52 causing gas, e.g., air, to flow through the conduit 52 at a flow rate sufficient to draw at least a plurality of pairs, i.e., at least three, of granules or pellets 42 of granular absorbent per second into the conduit inlet or intake 54 where the flowing gas, e.g., flowing air, then transports the granules or pellets 42 of granular absorbent entrained in the flowing gas, e.g., flowing air, toward the conduit outlet or discharge 58. One preferred gas mover 62 is a fan or blower 64, such as a centrifugal blower or squirrel cage blower, in gas-flow communication with the conduit 52 upstream of the conduit outlet or discharge 58. If desired, the gas mover 62 can be a vacuum pump or the like disposed downstream of the conduit inlet or intake 54 that can be disposed in gas-flow communication with the conduit outlet or discharge 58 creating a vacuum at the conduit inlet or intake 54 that sucks the granules or pellets 42 of granular absorbent into the inlet or intake 54 during operation.

An elongate blower pipe or hose 66 conveys gas, e.g., air, moved by the fan or blower 64 to the pneumatic conveyor conduit 52 with the blower pipe or hose 66 shown in FIG. 1A in gas-flow communication, e.g., air-flow communication, with the pneumatic conveyor conduit inlet or intake 54. As is further depicted in FIG. 1A, gas, e.g., air, from the fan or blower 64 is delivered via the pipe or hose 66 to the pneumatic conveyor conduit inlet or intake 54 upstream of the conduit inlet or intake 54 so as to cause uncoated granules or pellets 42 extruded from the extruder 48 to be directed into the conduit inlet or intake 54 as they are being extruded.

During operation, gas, e.g., air, from the fan or blower 64 delivered through pipe or hose 66 in gas-flow communication with the conduit inlet or intake 54 causes uncoated granules or pellets 42 of granular absorbent to be directed into the conduit inlet or intake 54 substantially simultaneously as fast as the uncoated granules or pellets 42 are extruded from the extruder 48. Preferably, at least a plurality of pairs of uncoated granules or pellets 42 of granular absorbent are drawn into the pneumatic conveyor conduit inlet or intake 54 per second as a result.

With continued reference to FIG. 1A, the granular absorbent conveyor and coating system 40a includes an extrudate discharge chamber 68, e.g., pellet collector or pellet collecting hopper, of the extruder 48 into which at least a plurality of pairs of uncoated granules or pellets 42 of granular absorbent are extruded by the extruder 48 per second during extruder operation. The extrudate discharge chamber 68 can and preferably does substantially gas-tightly enclose the discharge end 56 of the extruder 48. In a preferred embodiment, the chamber 68 can also include one or more selectively adjustable vents (not shown) that can be opened and/or selectively adjusted or regulated to control the rate and/or volume of flow of gas, e.g., air, entering or leaving the chamber 68 during operation. The chamber 68 can be a box or other enclosure extending outwardly from and substantially completely enclosing the discharge end 56 of the extruder 48 enclosing the discharge end 56 of the extruder 48 such that uncoated granules or pellets 42 of granular absorbent extruded from or by the extruder 48 are extruded into the chamber 68 during extruder operation.

In the preferred embodiment of the granular absorbent conveyor and coating system 40*a* shown in FIG. 1A, both the pneumatic conveyor conduit inlet or intake 54 and the gas mover hose or pipe 66 are in gas-flow, e.g., air-flow, communication with the extrudate discharge chamber 68 with the pneumatic conveyor conduit 52 and gas mover hose or pipe 66 each connected or coupled to the chamber 68. During extruder operation, gas, e.g., air, moved by the fan or blower 66 through the gas mover hose or pipe 66 is discharged from the hose or pipe 66 into the extrudate discharge chamber 68 causing gas, e.g., air, in turn to flow into the pneumatic conveyor conduit inlet or intake 54 drawing uncoated granules or pellets 42 as they are extruded from the extruder 48 to be drawn into the conduit inlet or intake 54. The gas, e.g., air, discharged from the hose or pipe 66 into chamber 68 creates a pressure differential inside the chamber 68 and conduit 52 relative to the ambient pressure of the atmosphere, e.g., air, ("ambient atmospheric pressure") outside the conduit 52 and chamber 68. This pressure differential can and preferably does create a partial vacuum at the conduit inlet or intake 54 which in turn causes the at least plurality of pairs, i.e., at least three, of uncoated granules or pellets 42 of granular absorbent extruded by the extruder 48 per second to be sucked or drawn from the chamber 68 into the conduit inlet or intake 54.

As the granules or pellets 42 are drawn from the extruder 48 into the intake 54 of the conduit 52 the granules or pellets 42 are transported through the conduit 52 preferably drying the granules or pellets 42 and cooling the granules or pellets 42 by turbulently flowing air carrying the granules or pellets 42 through the conduit 52. As also disclosed elsewhere herein, the granules or pellets 42 are dried by reducing a moisture content of each granule or pellet 42 at least 1% by weight from an initial moisture content of the granules or pellets 42 entering the conduit 52 through the intake 54 to a final moisture content of the granules or pellets 42 exiting an outlet 58 of the conduit 52. In one preferred method, granule or pellet moisture content is reduced at least 2% and preferably is reduced at least 3% from being dried during transport through the conduit 52. In another preferred method, granule or moisture content is reduced at least 4%. In a still further preferred method, granule or moisture content is reduced at least 5%.

During transport, each extruded granule or pellet 42 also is cooled while being dried. In a preferred method, each granule or pellet preferably is cooled at least 10 degrees Celsius and preferably at least 15 degrees Celsius during pellet transport, preferably while also being dried. In a preferred cooling step, each granule or pellet preferably is cooled at least 15 degrees Celsius to a temperature that is within 10 degrees Celsius of room temperature, e.g., within 10 degrees Celsius of 23 degrees Celsius. In another preferred cooling step, each granule or pellet preferably is cooled at least 25 degrees Celsius to a temperature that is within 10 degrees Celsius of room temperature, e.g., within 10 degrees Celsius of 23 degrees Celsius. In still another preferred cooling step, each granule or pellet preferably is cooled at least 30 degrees Celsius to a temperature that is within 10 degrees Celsius of room temperature, e.g., within 10 degrees Celsius of 23 degrees Celsius.

In a preferred method of substantially simultaneously cooling and drying granules or pellets 42 after being extruded from the extruder 48 during transport through the conduit 52, extruded granules or pellets 42 are sucked into the pneumatic conveyor intake 54 and dried by reducing their moisture content at least 1% and cooled at least 10 degrees Celsius during transport from the conduit intake 54 to the conduit outlet 58. In another preferred method of cooling and drying extruded granules or pellets 42 during pneumatic conveyor conduit transport, the granules or pellets 42 are dried by reducing granule or pellet moisture content at least 1% by pellet weight and reducing granule pellet temperature at least 15 degrees Celsius during transport through the conduit 52. In still another preferred method of cooling and drying extruded granules or pellets 42 during pneumatic conveyor conduit transport, the granules or pellets 42 are dried by reducing granule or pellet moisture content at least 1% by pellet weight and reducing granule pellet temperature at least 20 degrees Celsius during transport through the conduit 52. In another preferred method of cooling and drying extruded granules or pellets 42 during pneumatic conveyor conduit transport, the granules or pellets 42 are dried by reducing granule or pellet moisture content at least 1% by pellet weight and reducing granule pellet temperature at least 30 degrees Celsius during transport through the conduit 52.

In another preferred method of substantially simultaneously cooling and drying granules or pellets 42 after being extruded from the extruder 48 during transport through the conduit 52, extruded granules or pellets 42 are sucked into the pneumatic conveyor intake 54 and dried by reducing their moisture content at least 2% and cooled at least 10 degrees Celsius during transport from the conduit intake 54 to the conduit outlet 58. In another preferred method of cooling and drying extruded granules or pellets 42 during pneumatic conveyor conduit transport, the granules or pellets 42 are dried by reducing granule or pellet moisture content at least 2% by pellet weight and reducing granule pellet temperature at least 15 degrees Celsius during transport through the conduit 52. In still another preferred method of cooling and drying extruded granules or pellets 42 during pneumatic conveyor conduit transport, the granules or pellets 42 are dried by reducing granule or pellet moisture content at least 2% by pellet weight and reducing granule pellet temperature at least 20 degrees Celsius during transport through the conduit 52. In another preferred method of cooling and drying extruded granules or pellets 42 during pneumatic conveyor conduit transport, the granules or pellets 42 are dried by reducing granule or pellet moisture content at least 2% by pellet weight and reducing granule pellet temperature at least 30 degrees Celsius during transport through the conduit 52.

Air preferably is drawn from ambient outside the extruder 48 and conduit 52 by the pneumatic conveyor with the ambient air preferably having a temperature no greater than 32 degrees Celsius and preferably having a temperature of about room temperature, e.g., between 20-24 degrees Celsius. Air flowing through the conduit 52 during cooling and drying of the granules or pellets 42 carried by the air preferably has a temperature no greater than 50 degrees Celsius and preferably has a temperature less than 45 degrees Celsius at or adjacent, e.g., downstream of the inlet or intake 54 of the conduit 52. In a preferred method, the air flowing through the conduit 52 preferably has an average temperature no greater than 30 degrees Celsius and preferably has an average temperature no greater than about 27 degrees Celsius.

Such drying and cooling of the granules or pellets 42 as the granules or pellets 42 are being transported through the conduit 52 advantageously reduces granule or pellet shrinkage while also preventing density increases that can be viewed as undesirable. Such drying and cooling of the granules or pellets 42 also advantageously prevents loss of water soluble binder including by preventing loss of cold water soluble starch binder in each granule or pellet 42 that can occur after extrusion if not cooled and dried. Finally drying of the granules or pellets 42 is advantageously done using air at ambient temperatures, e.g., between 20 degrees Celsius and 24 degrees Celsius thereby drying and cooling without heating or using an oven to heat and dry the granules or pellets 42 thereby "cool drying" the granules or pellets 42 in fewer steps and using less energy. The above amounts or percentages of cooling and drying of the granules or pellets 42 during transport through the pneumatic conveyor conduit 52 are preferably also achieved substantially simultaneously during coating, wetting, liquid treatment and/or surface treatment to form smaller sized fines 164 of granular absorbent disclosed in more detail below.

If desired, the granular absorbent conveyor and coating system 40a can include a gas knife system 70 that preferably is an air knife system 72 that includes another gas mover 74 that preferably is a gas compressor 76, e.g., air compressor, which delivers gas, e.g., air, through an elongate tube or pipe 78 at a pressure greater than the ambient atmospheric pressure directed at or toward the discharge end 56 of the extruder 48 to help encourage uncoated granules or pellets 42 extruded by the extruder 48 into the pneumatic conveyor conduit inlet or intake 54 preventing the extruded granules or pellets 42 from accumulating in the extrudate discharge chamber 68 and/or becoming stuck to part of the chamber 68 and/or part of the extruder 48. Although not shown in FIG. 1A, a preferred embodiment of such an air knife system 72 can include a gas nozzle 73, e.g. air knife, in gas-flow, e.g., air-flow, communication with tube or pipe 78 and the extrudate discharge chamber 68 directing a stream of pressurized gas, e.g., air, towards or at a perforate extrusion die (not shown) disposed at the discharge end 56 of the extruder 48 from which the uncoated granules or pellets 42 of granular absorbent are extruded. Such an air knife 73 can be or include an elongate or linear nozzle 73 in gas-flow, e.g. air-flow, communication with the interior of the chamber 68 to direct a sheet of gas, e.g., air toward the extrusion die of the extruder 48 and/or any other location within the chamber 68 where extruded granules or pellets 42 tend to accumulate and/or stick to prevent such from happening.

With continued reference to FIG. 1A, the granular absorbent conveyor and coating system 40a further includes a coating material delivery system 80 that includes a source of coating material 82 where coating material 43 is held in a hopper or tank 81 with the coating material 43 delivered to the pneumatic conveyor 46 by an elongate conduit 84. During operation of the coating material delivery system 80, coating material 43 from the hopper or tank 81 is delivered by the coating material delivery conduit 84 to a location at or adjacent the discharge end 56 of the extruder 48 and/or pneumatic conveyor conduit 52 causing coating material 43 to be transported in the conduit 52 together with granules or pellets 42 of granular absorbent at least partially coating the granules or pellets 42 with coating material 43 as the granules or pellets 42 travel through conduit 52 toward the location 50 remote or downstream of the extruder 48.

The coating material delivery conduit 84 is connected to the extrudate discharge chamber 68 adjacent and/or upstream of the pneumatic conveyor conduit inlet or intake 54 such that coating material 43 discharged from the conduit 84 into the chamber 68 is sucked or otherwise drawn through the inlet or intake 54 into the pneumatic conveyor conduit 52 along with granules or pellets 42 extruded from the extruder 48. Coating material 43 is entrained together with granules or pellets 42 in the gas, e.g., air, flowing in the conduit 52 with granules or pellets 42 coming into contact with coating material 43 at least partially coating granules or pellets 42 with a layer of coating material 43 as the granules or pellets 42 are being transported in the conduit 52 toward the granular absorbent handling and/or processing station 60 disposed at the location 50 remote or downstream of the extruder 48.

Where the extruded granules or pellets 42 are still tacky, such as by still being moist after extrusion, coating material 43 flowing in the air stream inside conduit 52 with the granules or pellets 42 adheres to the granules or pellets 42 coating the granules or pellets 42 with the coating material 43 at least partially coating the pellets or granules 42. In a preferred granule or pellet embodiment, granules or pellets 42 having a liquid soluble binder which are tacky enable coating material 43, e.g. in particulate or granular form, to stick to the tacky outer surface of each granule or pellet 42 with wetted binder on the outer surface of each granule or pellet 42 acting as an adhesive that binds the coating material 43 to the pellet outer surface. As the coating material 43 adheres to the tacky outer pellet surface, wetted binder on the outer surface of each granule or pellet 42 glues coating material to the outer granule or pellet surface forming an outer granule or pellet layer composed of coating material 43 and binder that cures and hardens as the binder dries locking the coating material 43 in place. As the coating material 43 adheres to the wetted binder on the tacky outer surface of each granule or pellet 42, the coating material 43 dries at least the tacky outer surface of the granule or pellet 42 thereby more rapidly curing the wetted binder in the tacky outer surface of the granule or pellet 42 in a pellet coating step that advantageously also is a pellet drying step.

Delivery of coating material 43 from hopper or tank 81 can be via gravity feed, pressure feed, pneumatic feed, screw or auger feed, and/or using another type of feed. A nozzle, valve, or the like which can be manually and/or selectively controlled and/or regulated can be employed at or adjacent the end of the coating material delivery conduit 84 that is connected, e.g., in gas-flow or air-flow communication, with the extrudate discharge chamber 68 to meter or otherwise regulate the rate and/or amount of coating material 43 delivered into the chamber 68 by the coating material delivery system 80. In one preferred embodiment, the coating material 43 is a granular coating material, such in accordance with one or more formulations of the granular coating material 43 discussed hereinabove that can be provided in a dry powdered coating material format.

The granular absorbent conveyor and coating system 40a can further include a wetting system 86 having a source of wetting material 88 that preferably is a liquid, e.g., water, held in a container 90 that can be a hopper or tank 92 from which the wetting liquid is delivered via an elongate conduit 94 to the coating material delivery conduit 84, the extrudate discharge chamber 68, and/or the pneumatic conveyor conduit 52, such as is depicted in phantom in FIGS. 1A and/or 1B. In one preferred wetting system implementation shown in FIG. 1A, wetting liquid can be delivered via a branch 94a of the wetting liquid delivery conduit 94 into the extrudate discharge chamber 68 at or adjacent where the coating material delivery conduit 84 delivers coating material into the chamber 68 with one or both the coating material 43 and wetting liquid thereby being delivered into the chamber 68 upstream of the pneumatic conveyor conduit inlet or intake 54. Although not shown in FIG. 1A, branch 94a of the wetting liquid delivery conduit 94 preferably introduces wetting liquid into the extrudate discharge chamber 68 at a location different than the location where the coating material delivery conduit 84 delivers coating material into the same chamber 68. In one such preferred implementation, branch 94a introduces wetting liquid into the chamber 68 downstream of where coating material is introduced by the coating material delivery conduit 84 into the chamber 68 but upstream of the pneumatic conveyor conduit inlet or intake 54. In another such preferred implementation, branch 94a introduces wetting liquid into the chamber 68 upstream of the pneumatic conveyor conduit inlet or intake 54 and upstream of where coating material 43 is introduced into the chamber 68 via the coating material delivery conduit 84.

If desired, the wetting material delivery conduit 94 can deliver wetting liquid directly into the pneumatic conveyor conduit 52 via a different branch 94b that is connected to the pneumatic conveyor conduit 52 downstream of the conduit inlet or intake 54 and downstream of the extrudate discharge chamber 68 in another preferred wetting system implementation. In a still further wetting system implementation, the wetting material conduit 94 can have a plurality of branches 94a and 94b enabling wetting liquid to be introduced substantially simultaneously and/or alternately with coating material 43 into the pneumatic conveyor conduit 52 downstream of the conduit inlet or intake 54 and/or into extrudate discharge chamber 68.

Delivery of wetting liquid from the hopper or tank 92 can be via gravity feed, pressure feed, pump feed, pneumatic feed, screw or auger feed, and/or using another type of feed. A nozzle, valve, dispenser, or the like, which can be manually and/or selectively controlled and/or regulated, can be disposed at or adjacent the end of the wetting liquid delivery conduit 94, such as where the conduit 94 is connected, e.g., in gas-flow or air-flow communication, with the extrudate discharge chamber 68 and/or pneumatic conveyor conduit 52. This can be done to meter or otherwise regulate the rate and/or amount of wetting liquid delivered into the chamber 68 and/or conduit 52 by the wetting liquid delivery system 86. In one preferred embodiment, the wetting liquid is or includes water that can be delivered in the form of a stream and/or mist into chamber 68 and/or conduit 52 to at least partially wet granules or pellets 42 of granular absorbent being transported together with coating material in conduit 52 helping to facilitate at least partial coating of the granules or pellets 42 during transport in conduit 52.

During application of wetting liquid during the wetting step, liquid-absorbent pellets 42 are at least partially wetted with a wetting liquid during transport during at least a portion of the transport step. Such a wetting liquid can include water and can also include one or more pellet treatment materials mixed therewith, such as one or more pellet treatment materials used to scent, flavor, provide odor masking, provide an odor inhibitor, provide an anti-bacterial agent, provide an anti-fungal agent, and/or provide an anti-parasitic agent. In at least one wetting liquid used when a wetting step is carried out during or after a coating step to help facilitate coating of the pellets during the transport step, the wetting liquid can be or otherwise include water. In one such preferred wetting step carried out during or after a coating step, the wetting liquid includes water and one or more of the pellet treatment materials disclosed herein.

The wetting liquid can include a binder, such as a water-soluble adhesive, which is also applied to the pellets 42 being wetted during the wetting step during pellet transport together with the wetting liquid and/or can be mixed with the wetting liquid and applied with the wetting liquid. Suitable water-soluble binders that can be mixed into and applied with wetting liquid during the wetting step onto the pellets include starch-based or starch-containing water-soluble binders, dextrin, dextrin containing binders, dextrin-based binders, water-soluble bioadhesives, and/or other suitable water-soluble binders. In such a wetting step that includes application of a water-soluble adhesive mixed with the wetting liquid, the wetting liquid mixture can also include one or more pellet treatment materials used to apply a scent, a flavor, an odor mask, an odor inhibitor, an anti-bacterial agent, an anti-fungal agent, and/or an anti-parasitic agent such as described above.

As is also schematically depicted in FIG. 1A, the pneumatic conveyor 44 discharges granules or pellets 42 that have been at least partially coated with granular coating material 43 during transport of the granules or pellets 42 in the conduit 52. The at least partially coated absorbent granules or pellets 42 are discharged from the pneumatic conveyor conduit outlet or discharge 58 to a location 50 located downstream from the extruder 48 a distance away from the extruder 48 that can be a handling and/or processing station 60. In the preferred station embodiment shown in FIG. 1A, the station 60 is a coater 96 that coats absorbent granules or pellets 52. Where the granules or pellets 52 have been at least partially coated by the granular absorbent conveyor and coating system 40a, coater 96 further coats the granules or pellets 42 preferably with additional coating material 43 that preferably is or includes granular coating material 43 that can be or included powdered coating material 43.

With continued reference to FIG. 1A, the coater 96 can be a rotary agglomerator 98 that has a generally cylindrical rotary drum 100 that coats absorbent granules or pellets 52 inside the drum 100 with granular coating material 43, preferably powdered granular coating material 43, added to the drum 100 while the drum 100 is rotating. One preferred rotary agglomerator 98 is a rotary seasoner coater 102 having a rotary drum 100 that can be perforate that can also include a radiant and/or convective dryer arrangement 104 used to dry or further dry at least partially coated absorbent granules or pellets 42 including while the granules or pellets 42 are being coated with granular coating material 43 inside the seasoner coater 102.

Such a seasoner can be modified as a coater 102 to coat absorbent granules or pellets 42 by adding or including at least one granular coating delivery arrangement 106 that preferably is or includes at least one elongate longitudinally extending granular coating material delivery manifold 108 extending axially within the rotary drum 100 of the coater 96 with each manifold 108 having a plurality of spaced apart discharge dispensers or nozzles 110 from which granular coating material 43 is introduced into the rotating drum 100 during coater operation. Such a seasoner coater 102 can be further modified to add or include at least one wetting liquid delivery arrangement 112 (shown in phantom in FIG. 1A) that preferably is or includes at least one elongate longitudinally extending granular wetting liquid delivery manifold 114 extending axially within the rotary drum 100 of the coater 96 with each manifold 114 having a plurality of spaced apart discharge dispensers or nozzles 116 from which wetting liquid is introduced into the rotating drum 100 during coater operation.

Where the drying arrangement 104 includes a convective drying arrangement 118, the convective drying arrangement 118 can have an elongate generally longitudinally or axially extending manifold 120 having a plurality of axially or longitudinally spaced apart outlets 122 directing gas, preferably air, through and/or into the drum 100 during coater operation to dry the granules or pellets 42 by reducing their moisture content to a moisture content when discharged from the coater 96 that is less than when the granules or pellets 42 enter the coater 96. Such a convective drying arrangement 118 preferably includes a fan, compressor or blower 124 that delivers drying air through a conduit 126 to the dryer manifold 120.

During rotary seasoner coater operation, the drum 100 is rotated while granules or pellets 42, which can have been at least partially coated with coating material 43 applied during transport in pneumatic conveyor 44, are introduced through a coater inlet 130 into the rotating drum 100. An amount of coating material 43, such as a granular, preferably powdered, coating material 43 formulated in accordance with at least one such granular coating material 43 described above, is selectively introduced, preferably in a predetermined amount or charge, through at least one dispenser or nozzle 110 for a period of time, preferably a predetermined period of time, into the rotating drum 100 while the granules or pellets 42 are inside the drum 100 causing granular coating material 43 to coat and/or, where the granules or pellets 42 are already at least partially coated, further coat the granules or pellets 42 with granular coating material 43.

In one seasoner coater embodiment and method of coating using a seasoner modified to coat granular absorbent, a first charge of powdered coating material 43 is introduced into the drum 100 of the seasoner coater 96 through at least one dispenser or nozzle 110 while the rotating drum 100 also has at least a plurality of pairs of granules or pellets 42 of granular absorbent in the drum 100. A first amount or charge of wetting liquid is introduced into the drum 100 of the seasoner coater 96 through at least one dispenser or nozzle 116 during or following introduction into the drum 100 of the first charge of the powdered coating material 43 with the wetting liquid at least partially wetting the plurality of pairs of granules or pellets 42 of granular absorbent causing powdered granular coating material 43 to adhere or better adhere to at least a plurality of the plurality of pairs of granules or pellets 42. As the plurality of pairs of granules or pellets 42 travel through the rotary drum 100 of the seasoner coater 96, at least a plurality of charges of powdered coating material 43 and at least a plurality of charges or metered amounts of wetting liquid are substantially simultaneously and/or alternately introduced into the rotating drum 100 coating and/or at least further coating each one of the plurality of pairs of granules or pellets 42 in the drum before the coated or further coated plurality of pairs of granules or pellets 42 exit out a coater discharge 132.

During coater operation, a charge or metered amount of wetting liquid is applied onto a plurality of pairs of granules or pellets 42 traveling through the drum 100 wetting the outer surface of each one of the granules or pellets 42 causing each charge granular coating material 43 introduced into the drum 100 to adhere or better adhere to the granules or pellets 42. During wetting of the plurality of pairs of granules or pellets 42, liquid soluble starch-containing binder in an outer surface of each granule or pellet 42 is at least partially solubilized by and/or into the wetting liquid creating a moist or wet gel or paste outer granule or pellet surface onto which particles of the granular coating material 43 stick. Repeated application of wetting liquid through carrying out a plurality of wetting liquid application cycles at one or more longitudinally or axially spaced apart locations 110 within the rotating drum 100 of the coater 96 causes at least a plurality of pairs of particles of the granular coating material 43 to be drawn into a relatively thin outer layer of the wetted starch-containing binder of each granule or pellet 42. By drawing out or teasing starch-containing binder of each granule or pellet 42 through application of wetting liquid in a plurality of wetting liquid application cycles carried out while the granules or pellets 42 are traveling through the coater drum 100, particles of granular coating material 43 become stuck to, enmeshed within and even solubilized by and/or into an outer layer or coating of the coating material 43 held together by a matrix of the starch-containing binder.

When coating is completed, a thin outer layer or coating that is at least one mil or micron thick substantially completely encapsulates each one of the plurality of pairs of at least partially coated absorbent granules or pellets 42 with the outer layer or coating formed of a matrix or resin of starch-containing binder in which particles of the granular coating material 43 are attached and/or embedded. This produces an outer coating that substantially completely encapsulates each one of the plurality of pairs of coated granules or pellets 42 having starch-containing binder that readily wets in the presence of a liquid, such as urine, liquid fecal material, liquid waste, toxic liquid waste material, oil, gasoline, kerosene, crude oil, etc. which activates and/or works in concert with the coating material 43 of the outer layer or coating of the coated granule(s) or pellet(s) 42 to better absorb the liquid during absorbent operation of the coated granules or pellets 42. The starch-containing binder that forms the coating matrix or binder of the outer layer or coating of each coated granule or pellet 42 in which the granular coating material 43 is attached and/or embedded, can and preferably does flow when the coated granules or pellets 42 are wetted with liquid during absorbent operation causing each wetted coated granule or pellet 42 to stick to or otherwise clump with at least a plurality of other coated granules or pellets 42 producing self-clumping granular absorbent operation.

While the rotary drum 100 of the seasoner coater 96 can be perforate, a housing or enclosure surrounding the drum 100 can be imperforate so as to enable excess gas, such as from the pneumatic conveyor 44, to be introduced into the drum 100 to reduce the moisture content of the granules or pellets 42 as they pass through the coater 96 while they are being coated and/or further coated by granular coating material 43. If desired, such a housing or enclosure can provide a substantially gas tight, e.g., air tight, seal about the coater drum 100. Where the coater 96 also is equipped with a drying arrangement 104, the drying arrangement 104 can also be used during coater operation to dry granules or pellets 42 being coated while excess gas, e.g., air, from the pneumatic conveyor 44 is also introduced into the coater 96.

If desired, part of the coater 96, such as part of its drum 100 and/or outer enclosure surrounding the drum 100 can have a drying arrangement 104 that can be configured with one or more inductive and/or radiant heaters or heating elements disposed adjacent the drum 100, including in contact with the drum 100, which can be longitudinally or axially spaced apart along the drum 100 to heat granules or pellets 42 traveling through the drum 100 of the coater 96 to reduce their moisture content. Such a drying arrangement 104 can also include a convective or air drying arrangement 118 that can be operated instead of and/or in addition to any induction and/or radiant heating elements to dry granules or pellets 42 in the coater 96.

Such drying air and/or heat can be selectively applied to granules or pellets 42 traveling in the rotating drum 100 of the seasoner coater 96 a distance downstream of the inlet 130 of the drum 100 and upstream of the outlet 132 of the drum 100. In one preferred seasoner coater embodiment, granular coating material 43 and/or wetting liquid is applied to granules or pellets 42 in a coating section 134 of the drum 100 disposed adjacent and downstream of the drum inlet 130 before the at least partially coated granules or pellets 42 reaches a drying section 136 of the drum 100 disposed downstream of the coating section 134 and upstream of the drum outlet 132.

FIG. 1B illustrates a second preferred embodiment of a granular absorbent conveyor and coating system 40b that is similar to the system 40a shown in FIG. 1A but which introduces coating material downstream of the pneumatic conveyor conduit inlet 54 by connecting or coupling the coating material delivery conduit 84 to the pneumatic conveyor conduit 52 downstream of the inlet 54. Where the system 40b also is equipped with a wetting liquid delivery system 86, the wetting liquid delivery conduit 94 also is connected to the pneumatic conveyor conduit 52 downstream of the inlet or intake 54 of the conduit 52. If desired, the wetting liquid delivery conduit 94 can have one branch 94a that enables wetting liquid to be introduced into the pneumatic conveyor conduit 52 at or adjacent the location where the coating material delivery conduit 84 introduces coating material 43 into the pneumatic conveyor conduit 52 and/or another branch 94b that enables wetting liquid to be introduced into the conduit 52 downstream of the location where the coating material delivery conduit 84 introduces coating material 43 into the pneumatic conveyor conduit 52.

Figure 2A:
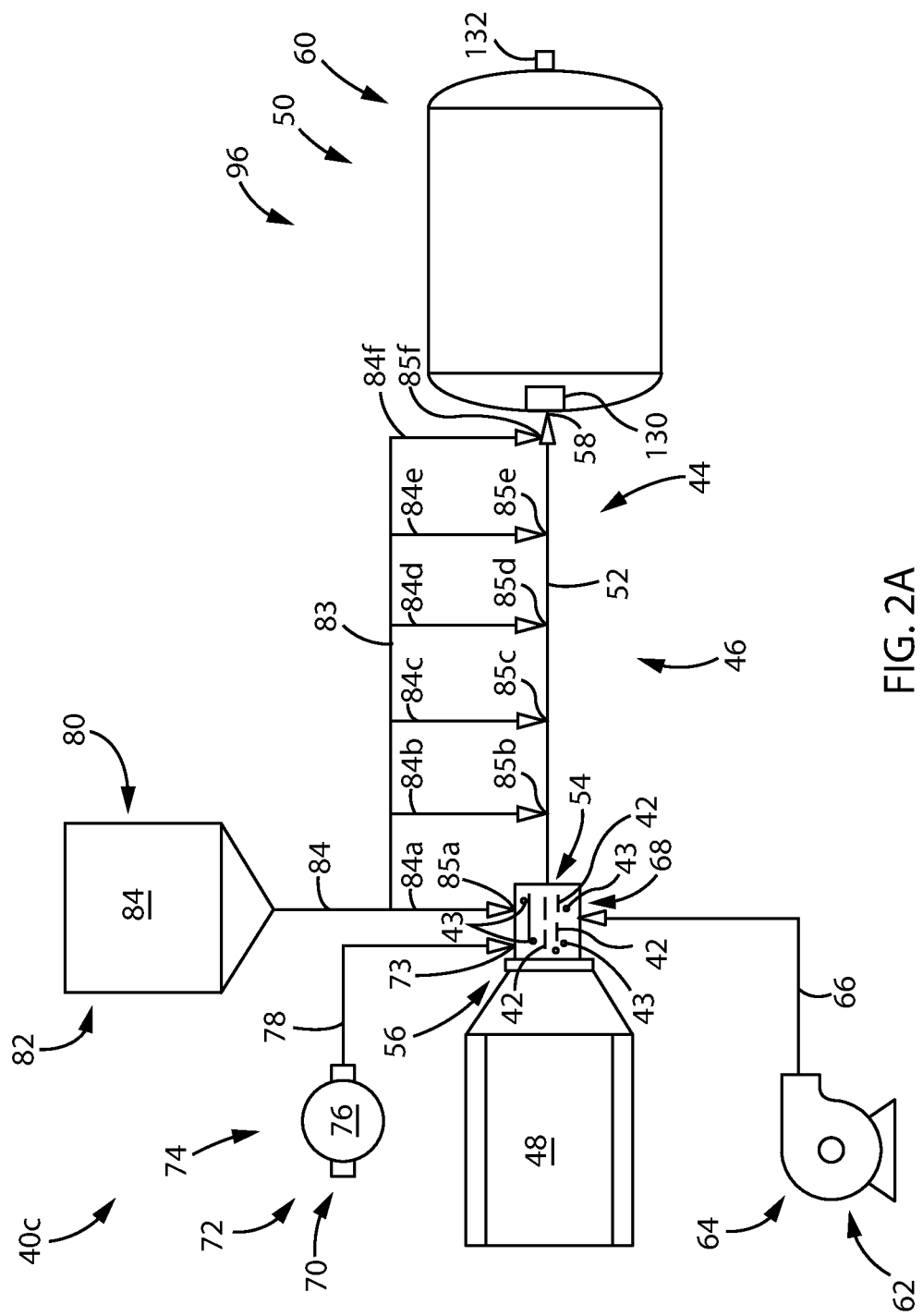
FIG. 2A illustrates a schematic diagram of a third preferred system for treating granular absorbent during granular absorbent transport from an extruder using a pneumatic conveyor.

FIG. 2A illustrates third preferred embodiment of a granular absorbent conveyor and coating system 40c constructed in accordance with the present invention that is similar to FIG. 1A but which has a coating material manifold 83 from which plurality of pairs of coating material conduit branches 84a, 84b, 84c, 84d, 84e, and 84f extend that are used to deliver coating material 43 into not only the extrudate discharge chamber 68 at 85a but also into the pneumatic conveyor conduit 52 at a plurality of axially or longitudinally spaced apart locations 85b, 85c, 85d, 85e, and 85f downstream of the conduit inlet or intake 54. A manually or selectively operable dispenser, such as a nozzle, valve or other dispenser that can be electrically and/or electromagnetically actuated, e.g. solenoid actuated, is disposed at each location 85a, 85b, 85c, 85d, 85e, and 85f enabling each to be independently operated to dispense coating material 43 as needed. Where electrically and/or electromagnetically actuated, a controller, such as a programmable logic controller (PLC) can be used to selectively dispense coating material at or through one or more of the dispensers 85a, 85b, 85c, 85d, 85e, and 85f, including at or through a plurality of the dispensers 85a, 85b, 85c, 85d, 85e, and 85f at substantially the same time, during operation of system 40c. FIG. 2A further differs from FIG. 1A in that the system 40c does not employ any wetting liquid delivery system.

Figure 2B:
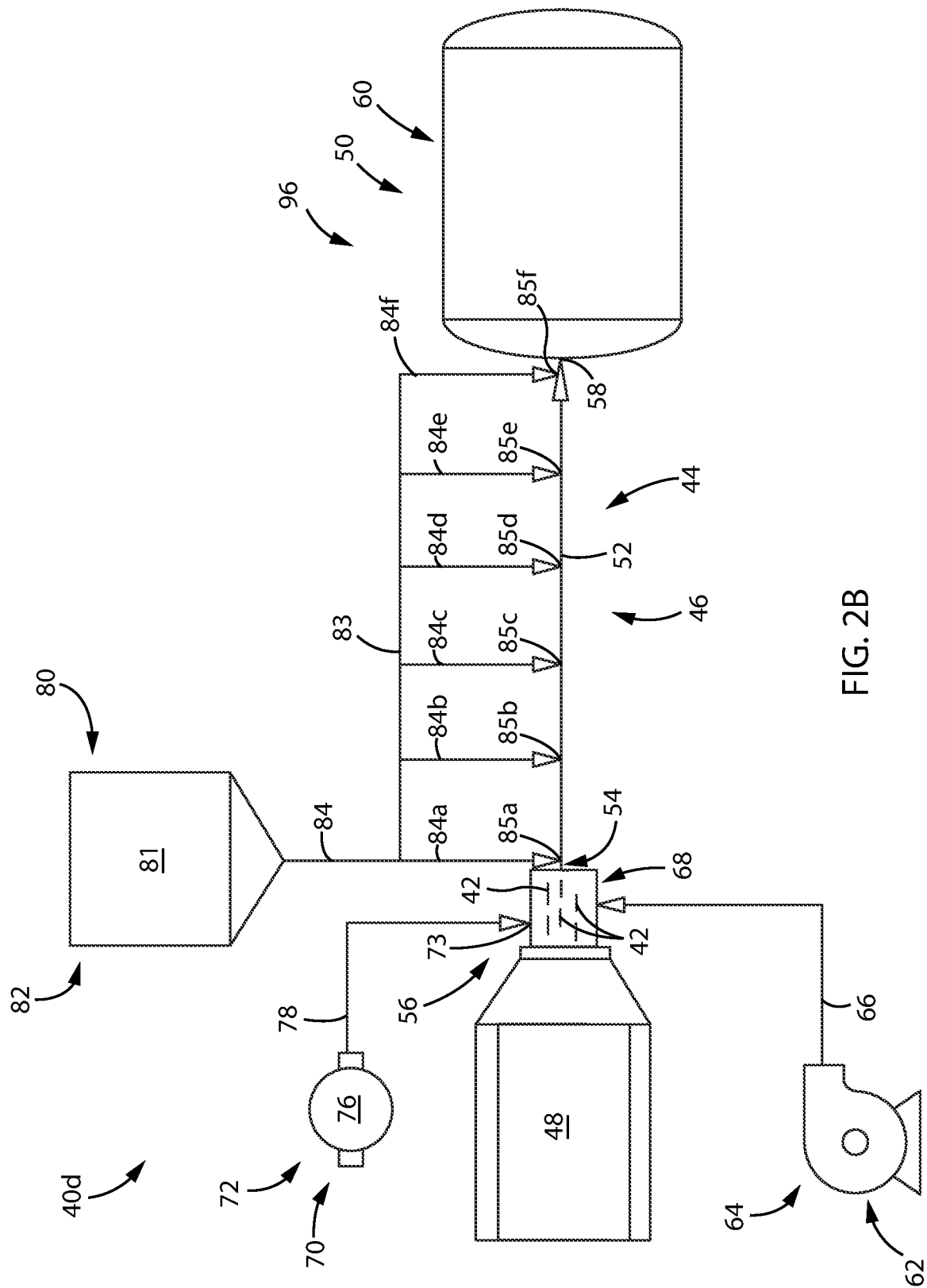
FIG. 2B illustrates a schematic diagram of a fourth preferred system for treating granular absorbent during granular absorbent transport from an extruder using a pneumatic conveyor.

FIG. 2B illustrates fourth preferred embodiment of a granular absorbent conveyor and coating system 40d constructed in accordance with the present invention that is similar to FIG. 1B but which has a plurality of pairs of coating material conduit branches 84a, 84b, 84c, 84d, 84e, and 84f used to deliver coating material 43 into the pneumatic conveyor conduit 52 at a plurality of axially or longitudinally spaced apart locations 85a, 85b, 85c, 85d, 85e, and 85f downstream of the conduit inlet or intake 54. A manually or selectively operable dispenser, such as a nozzle, valve or other dispenser that can be electrically and/or electromagnetically actuated, e.g. solenoid actuated, is disposed at each location 85a, 85b, 85c, 85d, 85e, and 85f enabling each to be independently operated to dispense coating material 43 as needed. Where electrically and/or electromagnetically actuated, a controller, such as a programmable logic controller (PLC) can be used to selectively dispense coating material at or through one or more of the dispensers 85a, 85b, 85c, 85d, 85e, and 85f, including at or through a plurality of the dispensers 85a, 85b, 85c, 85d, 85e, and 85f at substantially the same time, during operation of system 40c. FIG. 2B further differs from FIG. 1B in that the system 40d does not employ any wetting liquid delivery system.

Figure 3A:
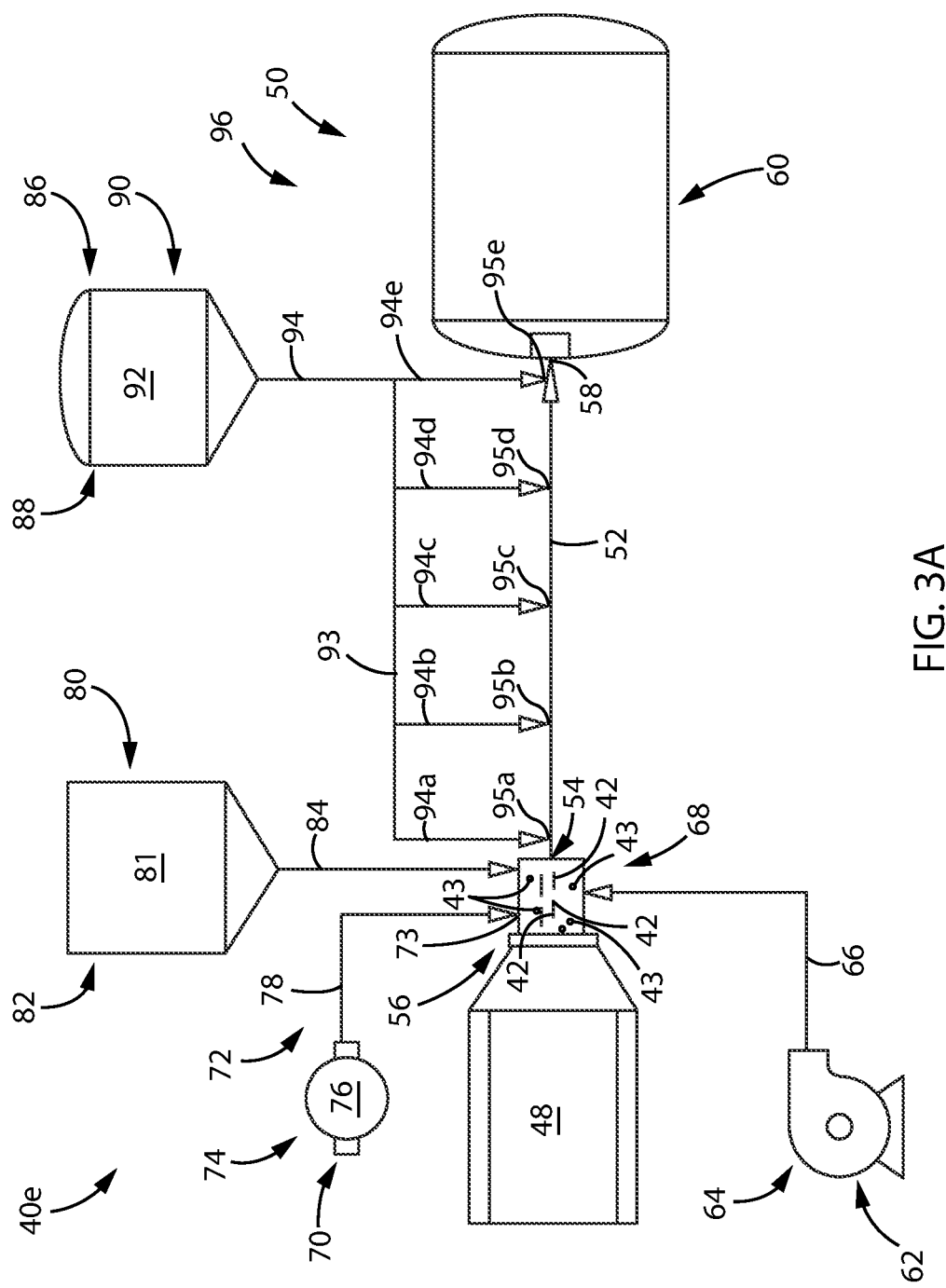
FIG. 3A illustrates a schematic diagram of a fifth preferred system for treating granular absorbent during granular absorbent transport from an extruder using a pneumatic conveyor.

FIG. 3A illustrates fifth preferred embodiment of a granular absorbent conveyor and coating system 40e constructed in accordance with the present invention that is similar to FIG. 1A but which has a wetting liquid delivery manifold 93 from which plurality of pairs of wetting liquid conduit branches 94a, 94b, 94c, 94d, and 94e extend that are used to deliver wetting liquid into the pneumatic conveyor conduit 52 at a plurality of axially or longitudinally spaced apart locations 95a, 95b, 95c, 95d, and 95e downstream of the conduit inlet or intake 54. A manually or selectively operable dispenser, such as a nozzle, valve or other dispenser that can be electrically and/or electromagnetically actuated, e.g. solenoid actuated, is disposed at each location 95a, 95b, 95c, 95d, and 95e enabling each to be independently operated to dispense wetting liquid as needed during operation of system 40e. Where electrically and/or electromagnetically actuated, a controller, such as a programmable logic controller (PLC) can be used to selectively dispense wetting liquid at or through one or more of the dispensers 95a, 95b, 95c, 95d, and 95e, including at or through a plurality of the dispensers 95a, 95b, 95c, 95d, and/or 95e, including at substantially the same time, during operation of system 40e.

Figure 3B:
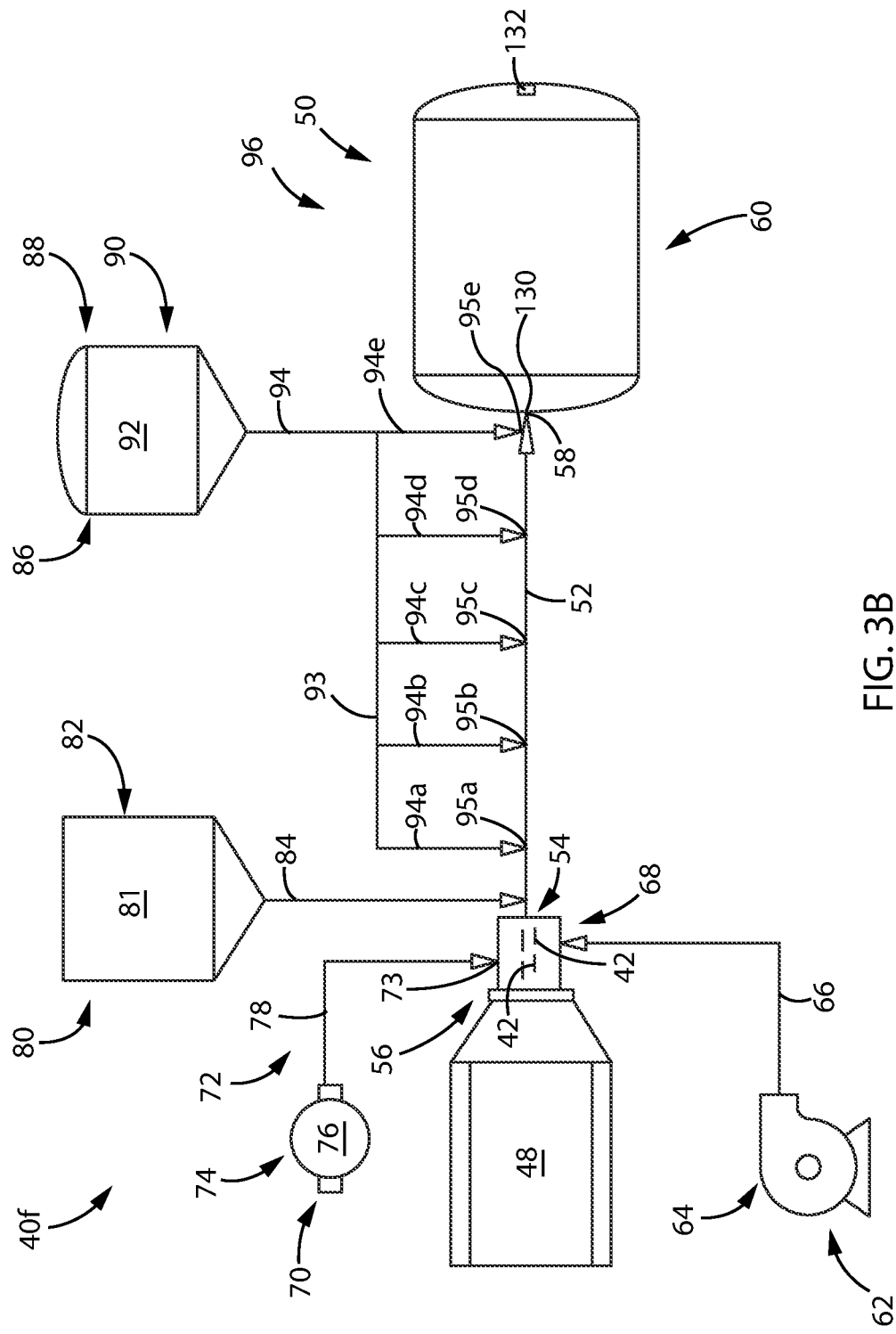
FIG. 3B illustrates a schematic diagram of a sixth preferred system for for treating granular absorbent during granular absorbent transport from an extruder using a pneumatic conveyor.

FIG. 3B illustrates sixth preferred embodiment of a granular absorbent conveyor and coating system 40f constructed in accordance with the present invention that is similar to FIG. 1B but which like FIG. 3A has a wetting liquid delivery manifold 93 from which plurality of pairs of wetting liquid conduit branches 94a, 94b, 94c, 94d, and 94e extend that are used to deliver wetting liquid from tank 92 into the pneumatic conveyor conduit 52 at a plurality of axially or longitudinally spaced apart locations 95a, 95b, 95c, 95d, and 95e along the conduit 52 located downstream of the conduit inlet or intake 54. A manually or selectively operable dispenser, such as a nozzle, valve or other dispenser that can be electrically and/or electromagnetically actuated, e.g. solenoid actuated, is disposed at each location 95a, 95b, 95c, 95d, and 95e enabling each to be independently operated to dispense wetting liquid as needed during operation of system 40f. Where electrically and/or electromagnetically actuated, a controller, such as a programmable logic controller (PLC) can be used to selectively dispense wetting liquid at or through one or more of the dispensers 95a, 95b, 95c, 95d, and 95e, including at or through a plurality of the dispensers 95a, 95b, 95c, 95d, and/or 95e, including at substantially the same time, during operation of system 40f.

Figure 4A:
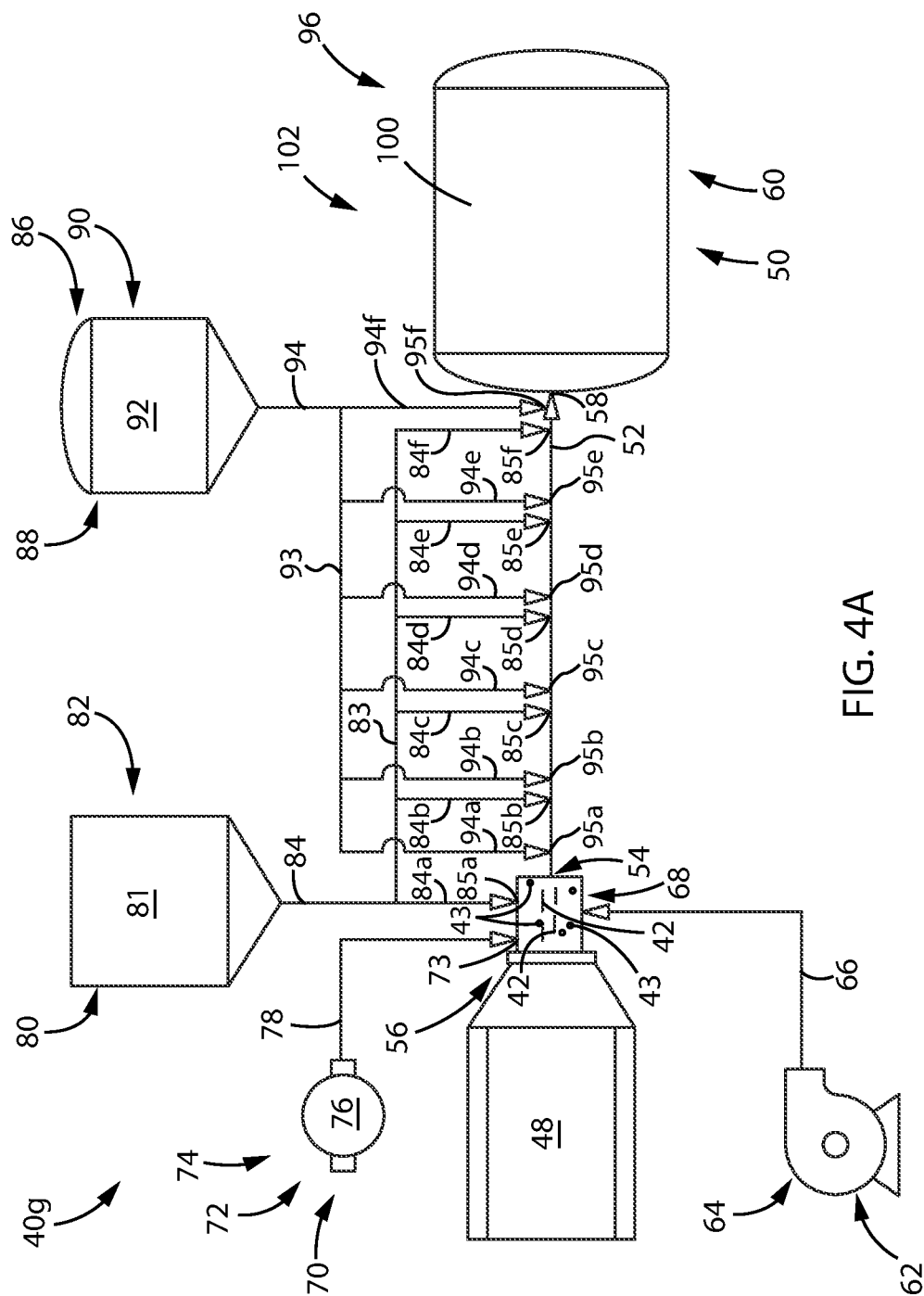
FIG. 4A illustrates a schematic diagram of a seventh preferred system for treating granular absorbent during granular absorbent transport from an extruder using a pneumatic conveyor.

FIG. 4A illustrates a seventh preferred embodiment of a granular absorbent conveyor and coating system 40g constructed in accordance with the present invention that is similar to FIG. 1A but which has a coating material manifold 83 from which plurality of pairs of coating material conduit branches 84a, 84b, 84c, 84d, 84e, and 84f extend that are used to deliver coating material 43 not only into the extrudate discharge chamber 68 at 85a but also into the pneumatic conveyor conduit 52 at a plurality of axially or longitudinally spaced apart locations 85b, 85c, 85d, 85e, and 85f along the conduit 52 located downstream of the conduit inlet or intake 54. A manually or selectively operable dispenser, such as a nozzle, valve or other dispenser that can be electrically and/or electromagnetically actuated, e.g. solenoid actuated, is disposed at each location 85a, 85b, 85c, 85d, 85e, and 85f enabling each to be independently operated to dispense coating material 43 as needed. Where electrically and/or electromagnetically actuated, a controller, such as a programmable logic controller (PLC) can be used to selectively dispense coating material at or through one or more of the dispensers 85a, 85b, 85c, 85d, 85e, and 85f, including at or through a plurality of the dispensers 85a, 85b, 85c, 85d, 85e, and 85f at substantially the same time, during operation of system 40g.

The system 40g of FIG. 4A also has a wetting liquid delivery manifold 93 from which plurality of pairs of wetting liquid conduit branches 94a, 94b, 94c, 94d, and 94e extend that are used to deliver wetting liquid into the pneumatic conveyor conduit 52 at a plurality of axially or longitudinally spaced apart locations 95a, 95b, 95c, 95d, and 95e along the conduit 52 downstream of the conduit inlet or intake 54. A manually or selectively operable dispenser, such as a nozzle, valve or other dispenser that can be electrically and/or electromagnetically actuated, e.g. solenoid actuated, is disposed at each location 95a, 95b, 95c, 95d, and 95e enabling each to be independently operated to dispense wetting liquid as needed during operation of system 40g. Where electrically and/or electromagnetically actuated, a controller, such as a programmable logic controller (PLC) can be used to selectively dispense wetting liquid at or through one or more of the dispensers 95a, 95b, 95c, 95d, and 95e, including at or through a plurality of the dispensers 95a, 95b, 95c, 95d, and/or 95e, including at substantially the same time, during operation of system 40g.

Figure 4B:
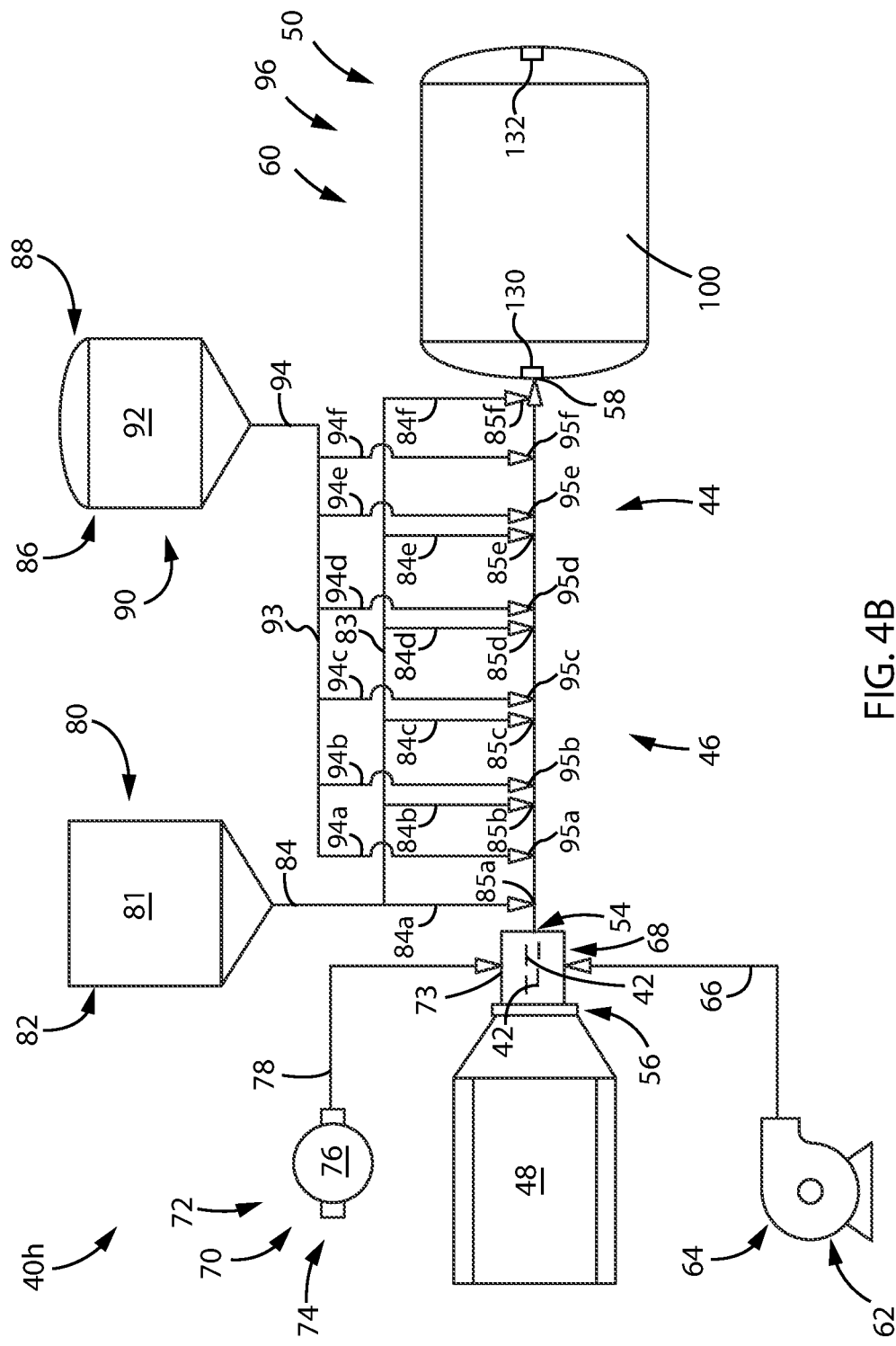
FIG. 4B illustrates a schematic diagram of an eighth preferred system for treating granular absorbent during granular absorbent transport from an extruder using a pneumatic conveyor.

FIG. 4B illustrates an eighth preferred embodiment of a granular absorbent conveyor and coating system 40h constructed in accordance with the present invention that is similar to FIG. 1B but which has a coating material manifold 83 from which plurality of pairs of coating material conduit branches 84a, 84b, 84c, 84d, 84e, and 84f extend that are used to deliver coating material 43 into the pneumatic conveyor conduit 52 at a plurality of axially or longitudinally spaced apart locations 85b, 85c, 85d, 85e, and 85f along the conduit 52 downstream of the conduit inlet or intake 54. A manually or selectively operable dispenser, such as a nozzle, valve or other dispenser that can be electrically and/or electromagnetically actuated, e.g. solenoid actuated, is disposed at each location 85a, 85b, 85c, 85d, 85e, and 85f enabling each to be independently operated to dispense coating material 43 as needed. Where electrically and/or electromagnetically actuated, a controller, such as a programmable logic controller (PLC) can be used to selectively dispense coating material at or through one or more of the dispensers 85a, 85b, 85c, 85d, 85e, and 85f, including at or through a plurality of the dispensers 85a, 85b, 85c, 85d, 85e, and 85f at substantially the same time, during operation of system 40h.

The system 40h of FIG. 4B also has a wetting liquid delivery manifold 93 from which plurality of pairs of wetting liquid conduit branches 94a, 94b, 94c, 94d, and 94e extend that are used to deliver wetting liquid into the pneumatic conveyor conduit 52 at a plurality of axially or longitudinally spaced apart locations 95a, 95b, 95c, 95d, and 95e along the conduit 52 downstream of the conduit inlet or intake 54. A manually or selectively operable dispenser, such as a nozzle, valve or other dispenser that can be electrically and/or electromagnetically actuated, e.g. solenoid actuated, is disposed at each location 95a, 95b, 95c, 95d, and 95e enabling each to be independently operated to dispense wetting liquid as needed during operation of system 40h. Where electrically and/or electromagnetically actuated, a controller, such as a programmable logic controller (PLC) can be used to selectively dispense wetting liquid at or through one or more of the dispensers 95a, 95b, 95c, 95d, and 95e, including at or through a plurality of the dispensers 95a, 95b, 95c, 95d, and/or 95e, including at substantially the same time, during operation of system 40h.

FIG. 5A illustrates an elongate section 150a of the conduit 52 of a pneumatic conveyor 44 that is used to convey or transport absorbent granules or pellets 42 extruded from the extruder 48 to a location 50 remote from the extruder 48 that can be a handling and/or processing station 60 such as a station where packaging of the absorbent granules or pellets 42 can be done, a station where the absorbent granules or pellets 42 can be coated, such as the coater station 96 like that depicted in FIG. 1A, and/or a station where a treatment, such as a liquid treatment, can be applied to the absorbent granules or pellets 42. The elongate section 150a of the pneumatic conveyor conduit 52 can be made of a tubular duct 152a that can be formed of a flexible material, such as plastic, foil, metal, or the like, of circular, square and/or generally rectangular cross-section through which gas, preferably air, flows carrying at least a plurality of pairs of the absorbent granules or pellets 42 toward the outlet or discharge 58 of the conduit 52.

Such a duct 152a has a width or diameter of at least two inches with the width or diameter of the duct 152a ranging from two inches to twelve inches with a preferred duct 152a having a width or diameter ranging between four inches and nine inches enabling a volumetric flow rate of air to be transported through the duct 152a of at least 500 cubic feet per minute, preferably between 1000 CFM and 2000 CFM, and more preferably between 1300 CFM and 1700 CFM. This produces a pneumatic conveyor 44 having an elongate conduit 52 that is an elongate duct 152a through which a sufficient flow or flow rate of air passes that produces a turbulent flow regime of air flowing within the duct 152a. Turbulently flowing air flowing in the conduit 52, i.e., through the duct 152a, causes the plurality of pairs of absorbent granules or pellets 42 to come into contact with one another as well as with an inner surface 154a of an endless sidewall 156a that forms the duct 152a. This contact can be and preferably is abrasive in nature causing at least some of the outer surface of each one of a plurality of pairs of granules or pellets 42 entrained in the turbulently flowing air to be abraded or polished in a surface preparation step, e.g. polishing step, which is carried out while the granules or pellets 42 are being transported.

Surface preparing, e.g. lightly abrading, of the granules or pellets 42 in the pneumatic conveyor conduit 52, e.g., duct 150a, by the pneumatic conveyor 44 during conveyance of the granules or pellets 42 toward the conduit outlet or discharge 58 can be carried out whether the granules or pellets 42 are ever coated and/or ever otherwise treated after being extruded from the extruder 48. If desired, as discussed in more detail below with regard to FIGS. 5A and 5B, surface preparation of uncoated granules or pellets 42 can be carried out during transport in the conduit 52 by the pneumatic conveyor 44 in such a surface preparation step in preparation for coating the surface prepared but uncoated granules or pellets 42 in a subsequent coating step or operation performed at a station following transport by the pneumatic conveyor 44. If desired, as discussed in more detail below with regard to FIGS. 6A and 6B, surface preparation of absorbent granules or pellets 42 can be carried out during transport in the conduit 52 by the pneumatic conveyor 44 in a surface preparation step that can be carried out with a coating step also performed during transport with the steps being performed separately from one another and/or at substantially the same time.

Such a surface preparation step removes projections 160 and surface irregularities 162 from granules or pellets 42 being transported by the pneumatic conveyor 44 advantageously breaking off at least a plurality of pairs of projections 160 and/or surface irregularities 162 from the granules or pellets 42 being transported in the duct 152a producing at least a plurality of pairs of fines 164 from abrasive surface preparation that are smaller in size than an average size of the granules or pellets 42 transported in the duct 152a during pneumatic conveyor operation. In one preferred surface preparation step and implementation, at least a plurality of the plurality of pairs of fines 164 produced during polishing have a size no greater than one-tenth the average size of the granules or pellets 42 transported in the duct 152a during pneumatic conveyor operation. In another preferred surface preparation step and implementation, each one of the plurality of pairs of fines 164 produced during polishing have a size no greater than one-tenth the average size of the granules or pellets 42 transported in the duct 152a during pneumatic conveyor operation.

The smaller sized fines 164 of granular absorbent produced during pneumatic conveyor operation during the surface preparation step are packaged with the absorbent granules or pellets 42 making up at least two percent and preferably at least five percent by packaged granular absorbent weight. The inclusion of such smaller sized fines 164 made of the same absorbent material as the absorbent granules or pellets 42 in retail or commercial packages of the granular absorbent advantageously promotes generally horizontal clumping of at least a plurality of pairs of granules or pellets 42 during use as an absorbent. In one preferred implementation and embodiment, the inclusion of at least two percent of the fines 164 produced during transport of absorbent granules or pellets 42 in conduit 52, e.g., elongate duct 152a, during pneumatic conveyor operation in retail packaged or commercially packaged granular pet or animal litter formed of such granules or pellets 42 and fines 164 produces a self-clumping lightweight pet or animal litter having a density of less than about 35 pounds and preferably less than 28 pounds that produces a clump formed of litter composed of a plurality of pairs of granules or pellets 42 and fines 164 by discharged pet or animal urine having a generally horizontal extent that is greater than a vertical extent. In short, such a pet or animal litter formulation formed of coated or uncoated absorbent granules or pellets 42 mixed together with at least five percent fines 164 by total packaged animal or pet litter weight produces a clump when wetted by animal or pet urine that is longer than the clump is deep having a lengthwise extent of the clump extending generally horizontally in the rest of the unused or unspent litter disposed in a litter box or the like holding the animal or pet litter. Such a clump also advantageously forms on top of other pellets 42 and fines 164 enabling the clump to be easily scooped up.

Surface preparation the absorbent granules or pellets 42 in such a surface preparation or polishing step while the granules or pellets 42 are being transported by turbulently flowing air flowing through the conduit 52, e.g., through duct 152a, of the pneumatic conveyor 44 also advantageously smooths and/or polishes the outer surface of at least a plurality of pairs of the granules or pellets 42 during surface preparation and transport. In one preferred implementation and embodiment for carrying out the surface preparation step, each one of the granules or pellets 42 transported by the pneumatic conveyor 42 in the conduit 52 is at least partially smoothed or polished by the surface preparation step such that at least a portion, preferably substantially all, of the outer surface of each granule or pellet 42 is smoothed and/or polished during pneumatic conveyor transport.

Smoothing and/or polishing of the outer surface of the granules or pellets 42 during pneumatic conveyor transport advantageously enables a coating to be applied to each one of at least a plurality of pairs of the granules or pellets 42 that is thinner and more uniform than if the surface preparation step was not carried out on the granules or pellets 42 during pneumatic conveyor transport. Where the granules or pellets 42 are coated, such as with a granular coating material 43 in accordance with any formulation specified above, the outer layer or coating substantially completely encapsulating the outer surface of each coated granule or pellet 42 has a substantially uniform coating or layer thickness that does not deviate in thickness by more than 35%. In another implementation and embodiment, executing the surface preparation step during pneumatic conveyor transport produces an outer coating having a substantially uniform thickness having less than 10% deviation in coating thickness throughout the layer or coating.

With continued reference to FIG. 5A, the duct 162a from which the pneumatic conveyor conduit 52 is formed has an endless sidewall156a that can be ribbed having at least one rib forming at least a plurality of pairs of rib projections 166a extending inwardly from the inner duct surface 154a against which granules or pellets 42 can contact, e.g., impact, during transport of the granules or pellets 42 in air turbulently flowing through the duct 152a. Such rib projections 166a can be formed by a plurality of pairs of ribs longitudinally or axially uniformly spaced apart substantially the length of the conduit 52, e.g., duct, or can be formed by a spiral or helical wire that supports the duct sidewall that extends substantially the entire length of the conduit 52, e.g., duct. As is shown in FIG. 5A, the shape of the rib projections 166a of the duct 152a can be wavy or sinusoidal. The shape of the rib projections 166b of the duct 152b can also have a zig-zag shape if desired, such as is depicted by the section of pneumatic conveyor conduit 52b shown in FIG. 5B.

FIGS. 6A and 6B depict sections of duct 156a and/or 156b, e.g., flexible duct, that form a pneumatic conveyor conduit 52 used in a granular absorbent conveyor and coating system constructed in accordance with the present invention, e.g. system(s) 40a-40h, to polish granules or pellets 42, including relatively thin plate, disc, disk, cupped, concave and especially flake-shaped granules or pellets 42, in a polishing step that produces fines 164 as uncoated granules or pellets 42 are transported in a transport step through the conduit 52, e.g., duct, from the extruder 48 towards the conduit outlet or discharge 58. The polishing step can be executed independently or separately from coating the granules or pellets 42 with coating material 43, e.g. granular (powdered) coating material 43, in a coating step that is also carried out while the granules or pellets 42 are being transported by air turbulently flowing through the conduit 52*a* or 52*b* toward the conduit outlet or discharge 58. Where the polishing step is carried out as a step separate from the coating step, the polishing step preferably is performed in a section of the conduit 52*a* or 52*b* disposed upstream of another section of the conduit 52*a* or 52*b* where the coating step is performed. In another implementation and embodiment, the polishing step and coating step can be performed substantially simultaneously including performing the polishing step and coating step along substantially the entire length of the conduit 52*a* and/or 52*b* such that the polishing step and coating step can be substantially performed during the entire transport step.

In a preferred surface treatment or preparation step, the pellet-abrading interior surface of the granule or pellet transport conduit 52 of the pneumatic conveyor produces fines 164 by breaking pieces off of the granular absorbent granules or pellets 42 being transported through the pneumatic conveyor conduit 52 that are smaller in size than each one of the granules or pellets 42 being transported. In one preferred surface treatment or preparation step, uncoated granules or pellets 42 are used such that the fines 164 produced are granular absorbent fines formed by the ribbed, roughened and/or three dimensionally contoured pellet-abrading interior surface of the pneumatic conveyor conduit 52 breaking pieces of granular absorbent off of uncoated granules or pellets 42 as the granules or pellets 42 are being transported through the conduit 52.

In one preferred surface treatment or preparation step, the amount of granular absorbent fines 164 produced by the time the granules or pellets 42 exit the conduit 52 constitutes at least 2% by weight of the total granular absorbent material exiting the conduit 52 where the total granular absorbent material exiting the conduit is defined as being the total amount of granular absorbent fines 164 plus the total amount of the granules or pellets 42 of granular absorbent material. In another preferred surface treatment or preparation step, the amount of granular absorbent fines 164 produced by the time the granules or pellets 42 exit the conduit constitutes at least 5% by weight of the total granular absorbent material exiting the conduit 52. In still another preferred surface treatment or preparation step, the amount of granular absorbent fines 164 produced by the time the granules or pellets 42 exit the conduit constitutes at least 10% by weight of the total granular absorbent material exiting the conduit 52. In a further preferred surface treatment or preparation step, the amount of granular absorbent fines 164 produced by the time the granules or pellets 42 exit the conduit constitutes at least 15% by weight of the total granular absorbent material exiting the conduit 52.

In one preferred surface treatment or preparation step, the pellet-abrading interior surface of the conduit 52 produces fines 164 that are less than one half of the size of the granules or pellets 42 exiting the conduit 52. In one such preferred surface treatment or preparation step, the pellet-abrading interior surface of the conduit 52 produces fines 164 that each have a size less than one half of the size of the granules or pellets 42 exiting the conduit 52. In another preferred surface treatment or preparation step, the pellet-abrading interior surface of the conduit 52 produces fines 164 that are less than one quarter of the size of the granules or pellets 42 exiting the conduit 52. In one such preferred surface treatment or preparation step, the pellet-abrading interior surface of the conduit 52 produces fines 164 with at least 25% of the fines 164 produced having a size less than one quarter of the size of the granules or pellets 42 exiting the conduit 52. In another such preferred surface treatment or preparation step, the pellet-abrading interior surface of the conduit 52 produces fines 164 with at least 25% of the fines 164 produced having a size less than one half of the size of the granules or pellets 42 exiting the conduit 52 and at least 15% of the fines 164 having a size less than one quarter of the size of the granules or pellets 42 exiting the conduit 52.

Producing a granular absorbent having such a mixture of granular absorbent granules or pellets 42 and smaller granular absorbent fines 164 forms clumps having at least a plurality of pairs, i.e., at least three granules or pellets 42, when granules or pellets 42 and fines 164 are wetted, e.g. with water, urine and/or liquid fecal matter, which desirably form or clump in a generally horizontal orientation in a box of granular absorbent, e.g., litter box filled with fines containing granular absorbent. Producing such a granular absorbent having such a mixture of granular absorbent granules or pellets 42 and smaller granular absorbent fines 164 produces clumps in a generally horizontal direction or orientation that each are formed of at least a plurality of pairs, i.e., at least three granules or pellets 42, when granules or pellets 42 and fines 164 are wetted, e.g. with water, urine and/or liquid fecal matter, which more desirably form or clump on top of a box of granular absorbent, e.g., on top of a litter box filled with fines containing granular absorbent containing both fines 164 and granules or pellets 42.

Where the granules or pellets 42 of granular absorbent are extruded from a starch-containing admixture at a minimum extruder pressure and minimum extruder temperature that produces extruded granules or pellets 42 each having at least 10% water-soluble binder, and preferably at least 15% water-soluble binder, by uncoated pellet weight formed from starch in the admixture during extrusion, without the use or presence of any other binder additive, a preferred method of coating during extruded granule or pellet transport in a pneumatic conveyor conduit 52 uses a tacky outer granule or pellet surface formed of wetted water-soluble binder as an outer layer of glue on the outer surface of each granule or pellet 42 to which coating material 43 sticks to or adheres during transport through the conduit 52. In one preferred coating method, granules or pellets 42 are drawn from the discharge chamber 68 of the extruder 48 into the pneumatic conveyor conduit 52 while water-soluble binder in the outer surface of the uncoated granules or pellets 42 is still tacky, e.g. sticky, from extrusion as the granules or pellets 42 can still be moist enough after extrusion for the water-soluble binder in the outer surface of each uncoated granule or pellet 42 to still be tacky or sticky. Coating material 43 entrained in the air carrying the granules or pellets 42 through the conduit 52 adheres or sticks to the tacky binder on the outer surface of each granule or pellet 42 with the binder at least partially coating or encapsulating particles or granules of the adhered coating material 43. In addition to the air flowing through the conduit 52 drying each granule or pellet 42 as each granule or pellet 42 is at least being partially coated with coating material 43 glued to the granule or pellet 42 with water-soluble binder from the granule or pellet itself, the coating material 43 also dries at least the outer surface of each granule or pellet 42 it becomes adhered to during pellet coating. As a result, the very act of coating each granule or pellet 42 with the drier coating material 43 not only dries each granule or pellet 42 during coating with the coating material 43, this drying action from being coated with coating material 43 dries and cures the tacky water-soluble binder of each granule or pellet 42 that is on the outer surface of each granule or pellet 42 bonding the coating material 43 thereto.

Where the granules or pellets 42 of granular absorbent are extruded from a starch-containing admixture at a minimum extruder pressure and minimum extruder temperature that produces extruded granules or pellets 42 each having at least 10% water-soluble binder, and preferably at least 15% water-soluble binder, by uncoated pellet weight formed from starch in the admixture during extrusion, without the use or presence of any other binder additive, another preferred method of coating during extruded granule or pellet transport in a pneumatic conveyor conduit 52 includes a wetting step where each granule or pellet 42 is wetted with a wetting liquid, such as disclosed above, which preferably includes water that makes at least some of the water-soluble binder in the outer surface of each granule or pellet 42 sticky or tacky by at least dissolving or solubilize and some of the water-soluble binder in the outer granule or pellet surface. This wetting step can be performed before coating material 43 is introduced into the air flowing through the conduit 42 that is carrying the granules or pellets 42 a way from the extruder 48 and can also be performed while the granules or pellets 42 and coating material 43 are flowing together through the conduit 52. Once each granule or pellet 42 is sufficiently wetted with the wetting liquid to make at least a portion of the outer surface of each granule or pellet 42 sufficiently tacky or sticky for coating material 43 to adhere thereto, coating of each granule or pellet 42 with coating material 43 advantageously dries each granule or pellet 42 and preferably also cures and hardens the binder on the outer surface of each granule or pellet 42 substantially permanently fixing the coating material 43 thereto producing an outer layer or coating at least partially coating each coated granule or pellet 42 formed of a relatively hard matrix of the cured hardened binder and particles or granules of coating material 43.

The particles or granules of coating material 43 are drier than the granular absorbent granules or pellets 42 having a moisture content less than the moisture content of the granules or pellets 42 upon entering the pneumatic conveyor conduit 52. The particles or granules of coating material 43 are smaller than the granular absorbent granules or pellets 42 and preferably much smaller with the particles or granules of coating material 43 preferably being no larger than $1/10^{th}$ the size of the granular absorbent granules or particles 42. In a preferred coating material, each granule or particle of coating material 43 has a size no greater than $1/50^{th}$ the size of the granular absorbent granules or particles 42.

In a preferred coating step, at least partially coating the granules or pellets 42 with drier coating material 43, which preferably includes particles or granules of bentonite, e.g., powdered bentonite, reduces the moisture content of the granules or pellets 42 by at least 1% by pellet weight from the moisture content of the granules or pellets 42 entering the conduit 52. In another preferred coating step, a drying step preferably is performed during coating where at least partially coating the granules or pellets 42 with such coating material 43 dries the granules or pellets 42 by reducing the moisture content of the granules or pellets 42 by at least 2% by application of the coating material 43 while the granules or pellets 42 are being transported through the conduit 52. In another such coating step where drying also is performed, the moisture content of the granules or pellets is reduced by at least 3%. In still another such coating step where drying also is performed, the moisture content of the granules or pellets is reduced by at least 4%. In a further such coating step where drying also is performed, the moisture content of the granules or pellets is reduced by at least 5%. In each of these preferred coating steps where drying occurs, application of the coating material 43 preferably causes the aforementioned reduction in moisture content with the air flowing through the conduit 52 reducing the moisture content of each granule or pellet 42 exiting the conduit 52 by at least an additional 1% by pellet weight.

Such a coating step and method of granule or pellet coating where each granule or pellet 42 has water-soluble binder sufficient to provide a sticky or tacky outer granule or pellet surface when wetted advantageously provides a coating method of the present invention where the granule or pellet itself provides the source of the glue, adhesive or binder to which the coating material 43 adheres or sticks to when at least partially coating each granule or pellet 42 during granule or pellet transport in a pneumatic conveyor conduit 52 away from the extruder 48. Such a coating step and method of granule or pellet coating also advantageously helps dry each granule or pellet 42 during coating during granule or pellet transport through the pneumatic conveyor conduit 52 while each granule or pellet 42 is being coated with coating material 43 during granule or pellet transport through the pneumatic conveyor conduit 52.

Where the granular absorbent is to be coated, a coating material that preferably is a granular coating material comprised of bentonite is introduced during transport of the granular absorbent to at least partially coat the granular absorbent during transport. Granular coating material can be applied onto freshly extruded granular absorbent upon extrusion while tacky to better adhere the coating material while also drying the granular absorbent during coating of the granular absorbent helping to minimize shrinkage and density. Coating material can be further applied to the granular absorbent while it is being transported at one or more locations downstream of the extruder to further coat the granular absorbent.

A wetting liquid can be applied to granular absorbent to treat granular absorbent while the granular absorbent is being transported. In a preferred method, wetting liquid is applied in a wetting step during granular absorbent transport where a coating step is performed to wet at least partially coated granular absorbent tackifying it to enable it to accept additional coating material to further coat it.

If desired, coating material can be applied to granular absorbent during transport of the granular absorbent at a plurality of locations downstream of the extruder. Where wetting liquid is used to facilitate granular absorbent coating, wetting liquid can also be applied to granular absorbent during transport of the granular absorbent at a plurality of locations downstream of the extruder.

In one system and method, coating material is repeatedly applied to granular absorbent during the coating step to granular absorbent being transported at a plurality of locations downstream of the extruder and wetting liquid is repeatedly applied to granular absorbent to wet the granular absorbent tackifying it so additional coating material will adhere to the tacky granular absorbent. Such application of coating materiel and wetting liquid can be done sequentially with coating material applied first before applying wetting liquid, can be done substantially simultaneously, and/or can be done as needed in at least partially coating granular absorbent during transport away from an extruder.

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A method for treating granular absorbent upon extrusion from an extruder comprising:
   (a) extruding from a discharge of an extruder from a starch-containing admixture within the extruder at least a plurality of pairs of extruded liquid-absorbent pellets per second at a minimum extruder temperature and a minimum extruder pressure that produces extruded liquid-absorbent pellets each having a water-soluble binder formed from starch in the starch-containing admixture during extrusion in an amount sufficient to produce a clump of the extruded liquid-absorbent pellets when wetted with water or urine without the presence of any other binder additive in the extruded liquid-absorbent pellets; and
   (b) transporting the liquid-absorbent pellets away from the extruder in a stream of turbulently flowing air upon the extruding of the extruded liquid-absorbent pellets from the discharge of the extruder, the stream of turbulently flowing air substantially simultaneously cooling and drying the extruded liquid-absorbent pellets to prevent loss of the water-soluble binder in the extruded liquid-absorbent pellets and without heating the extruded liquid-absorbent pellets (1)(i) from an initial temperature of the extruded liquid-absorbent pellets entering the turbulently flowing air stream, and (ii) to a temperature that is at least 15 degrees Celsius less than the initial temperature before exiting of the extruded liquid-absorbent pellets from the turbulently flowing air stream, and (2)(i) from an initial moisture content of the extruded liquid-absorbent pellets entering the turbulently flowing air stream, and (ii) to a moisture content that is at least 3% by pellet weight less than the initial moisture content before exiting of the extruded liquid-absorbent pellets from the turbulently flowing air stream.

2. The method of claim 1, wherein the turbulently flowing air substantially simultaneously cools and dries the liquid-absorbent pellets being transported in the turbulently flowing air without using an oven to heat and dry the liquid-absorbent pellets.

3. The method of claim 1, wherein the turbulently flowing air flows through an elongate pellet-transporting conduit transporting the liquid-absorbent pellets in the pellet-transporting conduit through the pellet-transporting conduit and away from the discharge of the extruder, and the transporting step (b) occurs while the liquid-absorbent pellets are being transported in the turbulently flowing air flowing through the pellet-transporting conduit.

4. The method of claim 3, further comprising an air mover in air-flow communication with the conduit, the air mover causing the turbulently flowing air to flow through the pellet-transporting conduit.

5. The method of claim 4, wherein the air mover comprises a blower, fan, compressor, or pump.

6. The method of claim 5, wherein the air mover comprises a centrifugal blower or squirrel cage blower.

7. The method of claim 4, wherein the air mover and the pellet-transporting conduit comprise a pneumatic conveyor.

8. The method of claim 4, wherein the turbulently flowing air flowing through the pellet-transporting conduit transporting the liquid-absorbent pellets through the conduit cools the liquid-absorbent pellets by reducing a temperature of the liquid absorbent pellets to a temperature that is at least 30° Celsius less than an initial temperature of the liquid-absorbent pellets entering the conduit.

9. The method of claim 4, wherein the air mover sucks the turbulently flowing air through the pellet-transporting conduit.

10. The method of claim 9, wherein the turbulently flowing air flows through the pellet-transporting conduit at a flow rate of at least 500 cubic feet per minute.

11. The method of claim 10, wherein the turbulently flowing air flows through the pellet-transporting conduit at a flow rate of between 1000 cubic feet per minute and 2000 cubic feet per minute.

12. The method of claim 4, wherein the turbulently flowing air flows through the pellet-transporting conduit at a flow rate of between 1000 cubic feet per minute and 2000 cubic feet per minute.

13. The method of claim 4, wherein the pellet-transporting conduit has (1) an inlet at one end, the pellet-transporting conduit inlet disposed in communication with the discharge of the extruder for receiving the liquid-absorbent pellets extruded from the discharge of the extruder, and (2) an outlet at an end of the pellet-transporting conduit opposite the inlet, the air mover in air flow communication with the conduit outlet.

14. The method of claim 13, further comprising an extrudate discharge chamber disposed in communication with the discharge of the extruder, the extrudate discharge chamber receiving the liquid-absorbent pellets extruded from the discharge of the extruder, and wherein the inlet end of the pellet-transporting conduit is disposed in the extrudate discharge chamber, the pellet-transporting conduit receiving the liquid-absorbent pellets extruded from the discharge of the extruder into the extrudate discharge chamber.

15. The method of claim 14, wherein the extrudate discharge chamber substantially gas-tightly encloses the discharge of the extruder.

16. The method of claim 15, wherein the extrudate discharge chamber has a vent configured to control a flow of air entering or leaving the extrudate discharge chamber.

17. The method of claim 16, wherein the turbulently flowing air flows through the pellet-transporting conduit at a flow rate of between 1500 cubic feet per minute and 2750 cubic feet per minute.

18. The method of claim 1, wherein the starch-containing admixture is composed of at least one cereal grain.

19. The method of claim 18, wherein the starch-containing admixture is comprised of at least one of corn and sorghum.

20. The method of claim 1, wherein the extruder is a single screw extruder.

21. The method of claim 1, wherein each extruded liquid-absorbent pellet is comprised of at least 7% water-soluble binder by pellet weight.

22. The method of claim 21, wherein each extruded liquid-absorbent pellet is comprised of at least 5% cold water-soluble binder by pellet weight.

23. The method of claim 1, wherein each extruded liquid-absorbent pellet is comprised of at least 15% water-soluble binder by pellet weight.

24. The method of claim 23, wherein each extruded liquid-absorbent pellet is comprised of at least 10% cold water-soluble binder by pellet weight.

25. The method of claim 1, wherein the extruded liquid-absorbent pellets are cooled to a temperature that is within 10 degrees of room temperature during the transporting step (b).

26. The method of claim 25, wherein the extruded liquid-absorbent pellets are cooled to a temperature that is within 10 degrees of 23° Celsius during the transporting step (b).

27. The method of claim 1, wherein the moisture content of the extruded liquid-absorbent pellets is reduced to a moisture content that is at least 4% less than the initial moisture content during the transporting step (b).

28. The method of claim 27, wherein the moisture content of extruded liquid-absorbent pellets is reduced to a moisture content that is between 5% and 15% by pellet weight after completing the transporting step (b).

29. The method of claim 1, wherein after the transporting step (b) and without being coated, the extruded liquid-absorbing pellets have a density of between 25 lbs/ft$^3$ and 32 lbs/ft$^3$.

30. The method of claim 1, wherein cooling and drying of the extruded liquid-absorbent pellets during the transporting step (b) is performed immediately upon extrusion of the extruded liquid-absorbent pellets from the discharge of the extruder.

31. A method for treating granular absorbent upon extrusion from an extruder comprising:
  (a) extruding from a discharge of an extruder from a starch-containing admixture within the extruder at least a plurality of pairs of extruded liquid-absorbent pellets per second at a minimum extruder temperature and a minimum extruder pressure that produces extruded liquid-absorbent pellets each having a water-soluble binder formed from starch in the starch-containing admixture during extrusion in an amount sufficient to produce a clump of the extruded liquid-absorbent pellets when wetted with water or urine without the presence of any other binder additive in the extruded liquid-absorbent pellets; and
  (b) transporting the liquid-absorbent pellets away from the extruder in a stream of turbulently flowing air upon the extruding of the extruded liquid-absorbent pellets from the discharge of the extruder, the stream of turbulently flowing air substantially simultaneously cooling and drying the extruded liquid-absorbent pellets to prevent loss of the water-soluble binder in the extruded liquid-absorbent pellets and without heating the extruded liquid-absorbent pellets (1)(i) from an initial temperature of the extruded liquid-absorbent pellets entering the turbulently flowing air stream, and (ii) to a temperature that is at least 15 degrees Celsius less than the initial temperature before exiting of the extruded liquid-absorbent pellets from the turbulently flowing air stream, and (2)(i) from an initial moisture content of the extruded liquid-absorbent pellets entering the turbulently flowing air stream, and (ii) to a moisture content that is at least 3% by pellet weight less than the initial moisture content before exiting of the extruded liquid-absorbent pellets from the turbulently flowing air stream; and
  wherein the water-soluble binder in each extruded liquid-absorbent pellet is comprised of dextrin.

32. A method for treating granular absorbent upon extrusion from an extruder comprising:
  (a) extruding from a discharge of an extruder from a starch-containing admixture within the extruder at least a plurality of pairs of extruded liquid-absorbent pellets per second at a minimum extruder temperature and a minimum extruder pressure that produces extruded liquid-absorbent pellets each having a water-soluble binder formed from starch in the starch-containing admixture during extrusion in an amount sufficient to produce a clump of the extruded liquid-absorbent pellets when wetted with water or urine without the presence of any other binder additive in the extruded liquid-absorbent pellets; and
  (b) transporting the liquid-absorbent pellets away from the extruder in a stream of turbulently flowing air upon the extruding of the extruded liquid-absorbent pellets from the discharge of the extruder, the stream of turbulently flowing air substantially simultaneously cooling and drying the extruded liquid-absorbent pellets to prevent loss of the water-soluble binder in the extruded liquid-absorbent pellets and without heating the extruded liquid-absorbent pellets (1)(i) from an initial temperature of the extruded liquid-absorbent pellets entering the turbulently flowing air stream, and (ii) to a temperature that is at least 15 degrees Celsius less than the initial temperature before exiting of the extruded liquid-absorbent pellets from the turbulently flowing air stream, and (2)(i) from an initial moisture content of the extruded liquid-absorbent pellets entering the turbulently flowing air stream, and (ii) to a moisture content that is at least 3% by pellet weight less than the initial moisture content before exiting of the extruded liquid-absorbent pellets from the turbulently flowing air stream; and
  wherein during the extruding step (a), the extruder is operated within a temperature range and a pressure range that causes dextrinization to occur during extrusion.

33. The method of claim 32, wherein each extruded liquid-absorbent pellet is comprised of at least 2% dextrin by pellet weight.

* * * * *